US011694454B2

(12) United States Patent
Ikeda

(10) Patent No.: US 11,694,454 B2
(45) Date of Patent: Jul. 4, 2023

(54) INFORMATION PROCESSING DEVICE AND DRIVING METHOD OF INFORMATION PROCESSING DEVICE

(71) Applicant: Japan Display Inc., Tokyo (JP)

(72) Inventor: Masataka Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 30 days.

(21) Appl. No.: 17/448,386

(22) Filed: Sep. 22, 2021

(65) Prior Publication Data

US 2022/0004757 A1 Jan. 6, 2022

Related U.S. Application Data

(63) Continuation of application No. PCT/JP2020/009257, filed on Mar. 4, 2020.

(30) Foreign Application Priority Data

Mar. 26, 2019 (JP) ................................ 2019-059366

(51) Int. Cl.

| | |
|---|---|
| ***G06V 20/80*** | (2022.01) |
| ***G06F 3/041*** | (2006.01) |
| ***G06F 3/044*** | (2006.01) |
| ***H04L 9/32*** | (2006.01) |
| ***G06V 20/00*** | (2022.01) |

(52) U.S. Cl.

CPC ............ *G06V 20/80* (2022.01); *G06F 3/044* (2013.01); *G06F 3/04166* (2019.05); *H04L 9/3278* (2013.01); *G06V 20/95* (2022.01)

(58) Field of Classification Search

CPC ..... G06F 3/04166; G06F 3/044; G06V 20/80; G06V 20/95; H04L 9/3278

See application file for complete search history.

(56) References Cited

U.S. PATENT DOCUMENTS

| | | | |
|---|---|---|---|
| 2016/0085961 | A1 | 3/2016 | Tanamoto et al. |
| 2018/0034804 | A1 | 2/2018 | Steiner |
| 2018/0115723 | A1 | 4/2018 | Takayanagi et al. |
| 2020/0267341 | A1 | 8/2020 | Baba et al. |

OTHER PUBLICATIONS

International Search Report dated Jun. 16, 2020 in PCT/JP2020/009257 filed on Mar. 4, 2020, 2 pages.

Office Action dated Dec. 6, 2022, in corresponding Japanese Application No. 2019-059366, 8 pages.

*Primary Examiner* — Michael Pervan

(74) *Attorney, Agent, or Firm* — Maier & Maier, PLLC

(57) ABSTRACT

An information processing device comprises an electronic device, an averaging circuit acquiring output signals from the electronic device multiple times in a predetermined period and averaging the signals acquired multiple times, a memory circuit storing an averaged signal averaged by the averaging circuit and a PUF-ID extraction circuit generating a unique identifier based on the averaged signal.

9 Claims, 10 Drawing Sheets

INFORMATION PROCESSING DEVICE AND DRIVING METHOD OF INFORMATION PROCESSING DEVICE

This application is a U.S. continuation application filed under 35 U.S.C. § 111(a), of International Application No. PCT/JP2020/009257 filed on Mar. 4, 2020, which claims priority to Japanese Patent Application No. 2019-059366 filed on Mar. 26, 2019, the disclosures of which are incorporated herein by reference.

FIELD

An embodiment of the present invention relates to an information processing device and a driving method of the information processing device.

BACKGROUND

In recent years, imitation, pirated, or counterfeit products have become problems in an electronic component having a semiconductor integrated circuit, an electronic device having the electronic component, or a system using the semiconductor integrated circuit and electronic component. For example, to prevent the manufacture of imitation, pirated, or counterfeits of the electronic components, the electronic devices, or the system using them, the use of an encryption technology using a secret key is one of the countermeasures against these problems.

As another measure against these problems, an information processing device, an information processing method, and a program using PUF (Physical Unclonable Function) are disclosed.

SUMMARY

An information processing device includes an electronic device, an averaging circuit acquiring output signals from the electronic device multiple times in a predetermined period and averaging the output signals acquired multiple times, a memory circuit storing an averaged signal averaged by the averaging circuit, and a PUF-ID extraction circuit generating a unique identifier based on the averaged signal.

A driving method of an information processing device includes acquiring output signals multiple times in a predetermined period, averaging the output signals acquired multiple times and generating a unique identifier based on an averaged signal.

An information processing device includes a touch panel; and a PUF-ID extraction circuit generating a unique identifier based on an output signal from the touch panel.

DESCRIPTION OF EMBODIMENTS

Embodiments of the present invention will be described below with reference to the drawings and the like. However, the present invention can be implemented in many different modes, and should not be construed as being limited to the description of the following embodiments. Although the drawings may be schematically represented for the sake of clarity of explanation with respect to widths, thicknesses, shapes, configurations, and the like of the respective portions in comparison with actual embodiments, they are merely examples and do not limit the interpretation of the present invention. The letters "first" and "second" attached to each element are convenient labels used to distinguish each element and have no further meaning unless otherwise stated.

One problem of the embodiments of the present invention is to provide an information processing device using a PUF and a driving method of an information processing device to prevent the manufacture of imitation, pirated, or counterfeit products.

In some embodiments described below, an information processing device and a driving method of the information processing device using a PUF will be exemplified.

1. First Embodiment

1-1. Configuration of Information Processing Device 10

Figure 1:
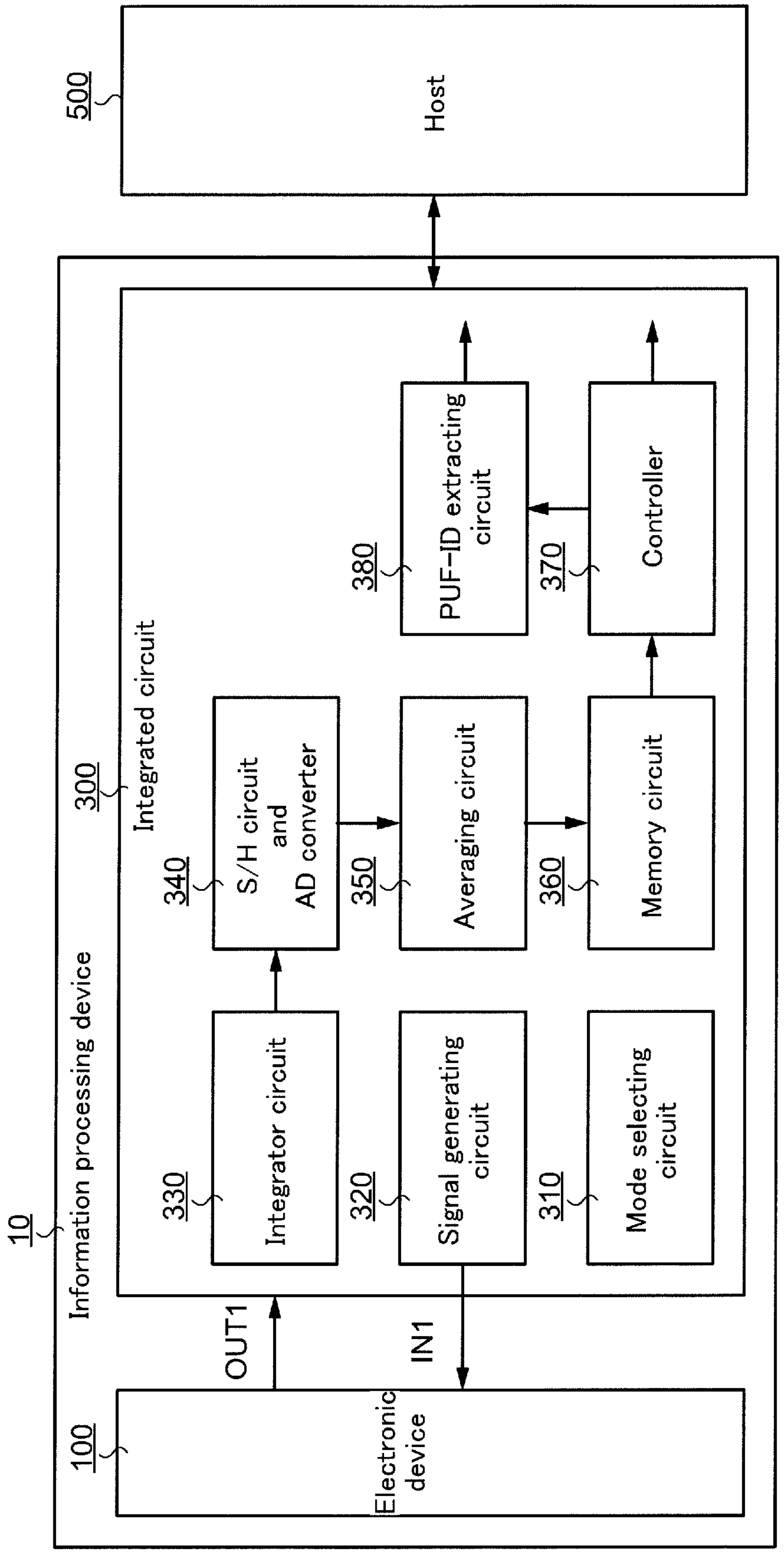
FIG. 1 is a plan view showing a configuration and a host of an information processing device according to an embodiment of the present invention.
Figure 2:
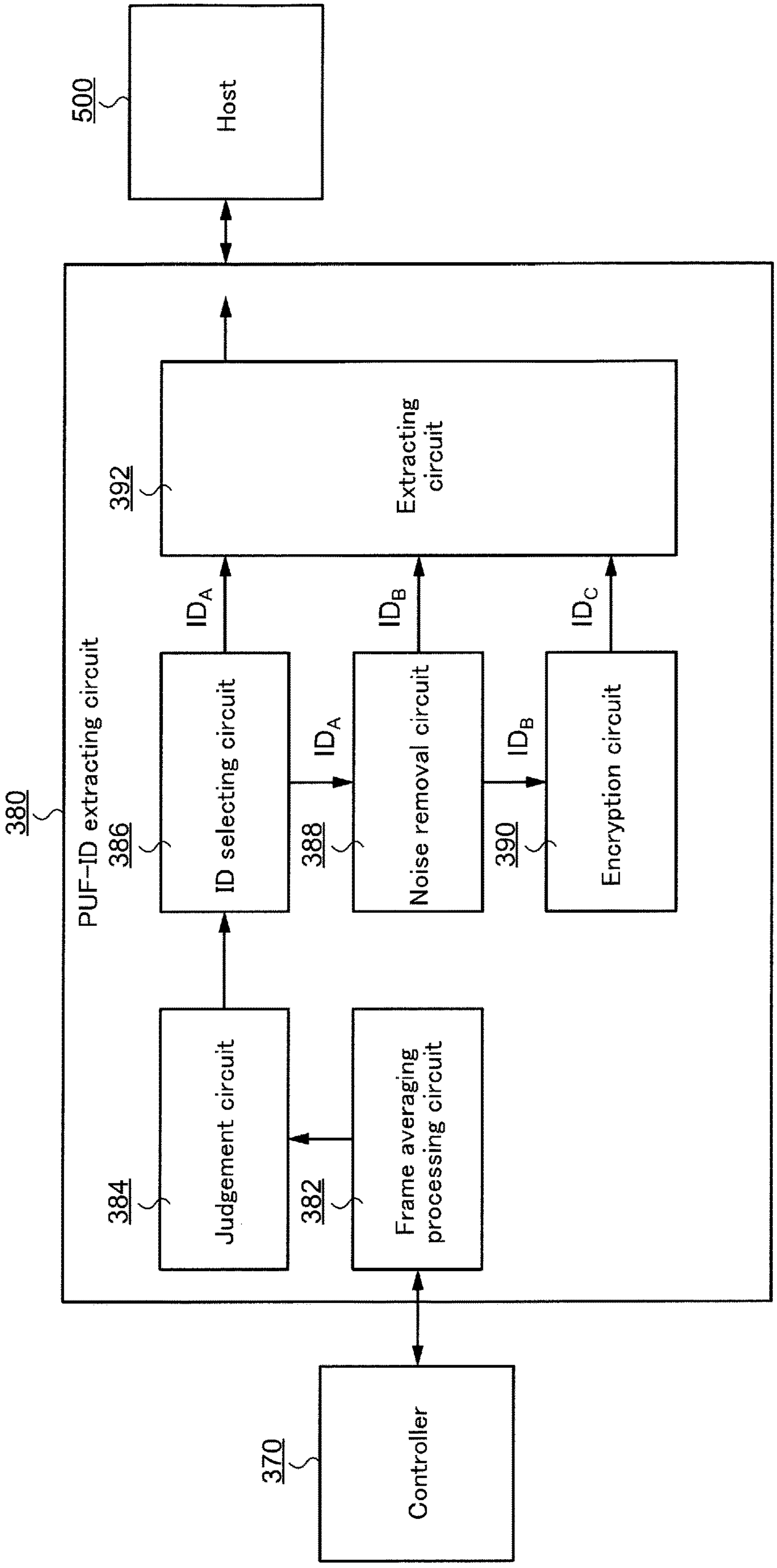
FIG. 2 is a plan view showing a configuration of a PUF-ID extracting circuit according to an embodiment of the present invention.

An information processing device 10 according to an embodiment of the present invention will be described with reference to FIGS. 1 and 2. FIG. 1 is a schematic plan view showing a configuration of the information processing device 10 and a host 500 according to an embodiment of the present invention. FIG. 2 is a schematic plan view showing a configuration of a PUF-ID extracting circuit 380 according to an embodiment of the present invention. The information processing device 10 is a device using the PUF.

As shown in FIG. 1, the information processing device 10 includes an electronic device 100 and an integrated circuit 300. The electronic device 100 is electrically connected to the integrated circuit 300. The information processing device 10 is electrically connected to the host 500. The information processing device 10 is a semiconductor integrated circuit.

The information processing device 10 may be connected to the host 500 by two-way communication over a wireless network. When the information processing device 10 is connected to the host 500 by two-way communication over a wireless network, for example, the information processing device 10 can be carried around. In this specification and the like, an example in which the information processing device 10 includes a touch panel as an example of the electronic device 100 is described, but is not limited to this example. For example, the electronic device 100 may be a display device, may be a device combining a touch panel and a device capable of displaying an image, or may be an imaging device having an image sensor. For example, the electronic device 100 may be a touch panel alone or a device that does not display an image, such as a storage device. The storage device is, for example, a non-volatile memory or a volatile memory. In addition, the touch panel may be an in-cell touch panel built into the display device, or may be an out-cell touch panel externally attached to the display device. In the electronic device 100 included in the information processing device 10, it is sufficient that values of physical characteristics are different for each measurement target such as an element included in the electronic device 100.

The host 500 is a computer that provides an application or a program to the information processing device 10 via a wireless network. For example, when the information processing device 10 requests the host 500 to provide an application, the host 500 provides an application installation file to the information processing device 10. The user can install an application in the information processing device 10 and use an application installed in the information processing device 10. For example, when the host 500 receives a request from the user or the information processing device 10 to provide an application or a program related to an operation mode, the host 500 provides an application installation file or a program to the information processing device 10. As a result, by installing the application in the information processing device 10 and using the application installed in the information processing device 10, the user can cause the information processing device 10 to execute a program related to the operation mode.

The integrated circuit 300 includes a mode selecting circuit 310, a signal generating circuit 320, an integrator circuit 330, an S/H circuit and AD converter 340, an averaging circuit 350, a memory circuit 360, a controller 370, and the PUF-ID extracting circuit 380.

The information processing device 10 has at least two operation modes, namely a normal operation mode and a PUF operation mode. The mode selecting circuit 310 can select either the normal operation mode or the PUF operation mode. The mode selecting circuit 310 may include an arithmetic processing circuit and a memory circuit. The mode selecting circuit 310 reads the program from the memory circuit and processes the signal, voltage, or data by the arithmetic processing circuit based on the read program. As will be described later, the normal operation mode performs an operation provided in the electronic device 100. For example, the normal operation mode detects the characteristics of each element included in the electronic device 100, and the information processing device 10 performs new processing based on the detection result. In addition, the normal operation mode detects the characteristics of each element included in the electronic device 100, outputs the detection result to the host 500, analyzes the detection result by the host 500, and feeds back the analysis result to the electronic device 100. On the other hand, as will be described in detail later, the PUF operation mode detects the characteristics of each element included in the electronic device 100, and generates a unique identifier (ID) to the information processing device 10 based on the detection result. When the normal operation mode is selected by the mode selecting circuit 310, the controller 370 is driven, and when the PUF-ID extracting circuit 380 is selected by the mode selecting circuit 310, both the controller 370 and the PUF-ID extracting circuit 380 are driven. For example, the mode selecting circuit 310 may receive data such as a number of a measurement target included in the electronic device 100 or a measurement target included in the electronic device 100 from the host 500 or a user (not shown) and perform processing based on the transferred data. That is, the mode selecting circuit 310 may perform processing based on an instruction from the host 500 or the user (not shown). In this specification and the like, the arithmetic processing circuit is, for example, a processor or a CPU.

Since the information processing device 10 according to an embodiment of the present invention includes the PUF-ID extracting circuit 380, it is possible to generate different information for each element by using the electronic device 100 or physical characteristics having different values for each element included in the electronic device 100. The information processing device 10 according to an embodiment of the present invention can set the information generated by the PUF-ID extracting circuit 380, which is different for each element, to the unique identifier (ID) to the information processing device 10. Therefore, since the information processing device 10 according to an embodiment of the present invention is distinguished from the imitation, pirated, or counterfeit products of the information processing device 10. As a result, the information processing device 10 according to an embodiment of the present invention can prevent the manufacture of the imitation, pirated, or counterfeit products of the information processing device 10 by having the PUF-ID extracting circuit 380.

Since the information processing device 10 according to an embodiment of the present invention has the controller 370, it is possible to detect the characteristics of each element included in the electronic device 100, and the information processing device 10 can perform new processing based on the detection result. In addition, since the information processing device 10 according to an embodiment of the present invention includes the controller 370, it is possible to detect the characteristics of each element included in the electronic device 100, and can feed back the detection result to the electronic device 100. The controller 370 may include the arithmetic processing circuit and the memory circuit. The controller 370 reads the program from the memory circuit and processes the signal, voltage, or data by the arithmetic processing circuit based on the read program.

The signal generating circuit 320 generates, for example, a drive signal for driving the controller 370. The signal generating circuit 320 is electrically connected to the electronic device 100. The signal generating circuit 320 may be electrically connected to each circuit included in the integrated circuit 300. The signal generating circuit 320 has the arithmetic processing circuit, and may generate the drive signal by the arithmetic processing circuit. The drive signal may be output from the signal generating circuit 320 and input to the electronic device 100, or may be output from the signal generating circuit 320 and input to each circuit included in the integrated circuit 300.

The integrator circuit 330 can obtain a result of integrating an input signal or an input voltage at a predetermined time as an output signal or an output voltage. The integrator circuit 330 is electrically connected to the electronic device 100. Since the integrated circuit 300 includes the integrator circuit 330, it is possible to obtain the result of integrating the output signal or the output voltage from each element included in the electronic device 100 as the input signal or the input voltage at the predetermined time. Therefore, it is possible to detect the characteristics of each element included in the electronic device 100. The output signal or the output voltage output by the integrator circuit 330 is an analog signal or an analog voltage.

The S/H circuit and AD converter 340 can store charges corresponding to the analog signal or analog voltage, and convert it into a digital signal. The S/H circuit and AD converter 340 are electrically connected to the integrator circuit 330. A result of converting the signal or the voltage output from the integrator circuit 330 into the digital signal as the input signal or the input voltage can be obtained by the S/H circuit and AD converter 340. Therefore, it is possible to detect the characteristics of each element included in the electronic device 100. The information processing device 10 includes two or more S/H circuits and AD converters 340, and it may be able to acquire two or more analog signals or analog voltages in parallel. That is, two or more S/H circuits and AD converters 340 may be capable of inputting two or more analog signals or analog voltages in parallel.

The averaging circuit 350 acquires the digital signal multiple times, and averages the digital signal acquired multiple times in a predetermined time period. The averaging circuit 350 may acquire two or more digital signals multiple times, respectively, and average each digital signal acquired multiple times in a predetermined period. The averaging circuit 350 may store a plurality of input digital signals. The averaging circuit 350 is electrically connected to the S/H circuit and AD converter 340. The averaging circuit 350 has the arithmetic processing circuit and averages the digital signal by the arithmetic processing circuit. The averaging circuit 350 may include a circuit that stores the averaged digital signal. The averaging circuit 350 may include the arithmetic processing circuit and the memory circuit. The averaging circuit 350 reads the program from the memory circuit and averages the digital signal by the arithmetic processing circuit based on the read program. The averaging circuit 350 may store the averaged digital signal in the memory circuit. The circuit or device for storing the digital signal is, for example, the memory circuit. The memory circuit is preferably a volatile memory typified by SRAM or DRAM. Since the integrated circuit 300 includes the averaging circuit 350, it is possible to average noises contained in the analog signal or the analog voltage output from the electronic device 100. Variations in a plurality of analog signals or analog voltages output from the electronic device 100 can be averaged. That is, since the integrated circuit 300 includes the averaging circuit 350, it is possible to eliminate or mitigate the noises or variations in the analog signal or the analog voltage and improve the conversion resolution of the analog signal or the analog voltage. Consequently, the detection accuracy of the controller 370 and the detection accuracy of the individual IDs output by the PUF-ID extracting circuit 380 are improved.

The memory circuit 360 may store the digital signal output from the averaging circuit 350. The memory circuit 360 is electrically connected to the controller 370. The memory circuit 360 may be electrically connected to the PUF-ID extracting circuit 380. Since the memory circuit 360 is electrically connected to the controller 370 or the PUF-ID extracting circuit 380, the digital signal averaged by the averaging circuit 350 is not fed directly to the host 500. Therefore, in the information processing device 10, it is possible to prevent the characteristic of each element included in the electronic device 100 from flowing out to the host 500. In addition, it is possible to suppress the generation of the unique ID to the information processing device 10 by a third party who has obtained the characteristic leaked from the leaked characteristic.

As shown in FIG. 2, the PUF-ID extracting circuit 380 includes, for example, a frame average processing circuit 382, a judgment circuit 384, an ID selecting circuit 386, a noise removal circuit 388, an encryption circuit 390, and an extracting circuit 392.

The PUF-ID extracting circuit 380 is supplied with the digital signal output from the memory circuit 360. The PUF-ID extracting circuit 380 processes the digital signal to generate the unique ID to the information processing device 10. The PUF-ID extracting circuit 380 supplies the generated unique ID to the information processing device 10 to the host 500 or the user based on the instruction from the host 500 or the user (not shown).

The frame average processing circuit 382 can calculate and output an average value of the digital signal at a predetermined time. The frame average processing circuit 382 is electrically connected to the memory circuit 360 and the judgment circuit 384. The digital signal output from the memory circuit 360 is supplied to the frame average processing circuit 382 as the input signal or the input voltage. The signal or the voltage output from the frame average processing circuit 382 to the judgment circuit 384 is also the digital signal. The frame average processing circuit 382 may include the arithmetic processing circuit and the memory circuit. The frame average processing circuit 382 reads the program from the memory circuit, determines the average number of frames, and acquires the input signal or the input voltage corresponding to each of the average number of frames based on the read program. The frame average processing circuit 382 averages the input signal or the input voltage corresponding to each of the average number of frames. The frame average processing circuit 382 may store the averaged input signal or the input voltage in the memory circuit. The frame average processing circuit 382 supplies the averaged input signal or the input voltage to the judgment circuit 384. The predetermined time here is, for example, a time from the display of the nth image on the electronic device 100 to the display of the n+1st image. The predetermined time may also be referred to as a period. The predetermined time or period is referred to as a frame. The frame average processing circuit 382 acquires the input signal or the input voltage for K frames, and can average the input signal or the input voltage of the acquired K frames. K is a natural number. The frame average processing circuit 382 can average the noises or variations included in the input signal or the input voltage as in the averaging circuit 350 described above. That is, since the PUF-ID extracting circuit 380 includes the frame average processing circuit 382, it is possible to eliminate or mitigate the noises or variations in the input signal or the input voltage. Thus, the conversion resolution of the signal or the voltage is improved. As a result, the accuracy of detecting the individual IDs output by the PUF-ID extracting circuit 380 is improved. The memory circuit included in the frame average processing circuit 382 may be a circuit similar to that of the memory circuit 360.

The judgment circuit 384 judges, for example, whether the frame averaging processed digital signal by the frame average processing circuit 382 is even or odd. The judgment circuit 384 may include the arithmetic processing circuit and the memory circuit. The judgment circuit 384 may read the program from the memory circuit or the host 500 and process the digital signal by the arithmetic processing circuit based on the read program. The judgment circuit 384 may store the digital signal processed by the arithmetic processing circuit in the memory circuit. The judgment circuit 384 may set the judgment result to 0 when the digital signal is an even number. The judgment circuit 384 may set the judgment result to 1 when the digital signal is an odd number. In this specification and the like, the frame averaged digital signal may be referred to as an averaged signal. Hereafter, the judgment result is referred to as a response, and the unique ID to the information processing device 10 is referred to as a response ID.

The judgment circuit 384 has a memory circuit, and the response and the response ID may be stored in the memory circuit included in the judgment circuit 384. The response and the response ID are supplied from the judgment circuit 384 to the ID selecting circuit 386, and may be stored in the ID selecting circuit 386. The arithmetic processing circuit is, for example, a processor or a CPU. The memory circuit included in the judgment circuit 384 may be a circuit similar to that of the memory circuit 360. When a plurality of input signals or input voltages is input to the integrated circuit 300, the judgment circuit 384 generates the response for each of the plurality of input signals or input voltages.

The judgment method of the judgment circuit 384 shown in this specification and the like is merely an example, and is not limited to this example. For example, the judgment circuit 384 may set the judgment result to 1 when the digital signal is an even number, and may set the judgment result to 0 when the digital signal is an odd number. The judgment circuit 384 may judge whether it is a large value or a small value for a predetermined threshold value.

The ID selecting circuit 386 generates the unique ID to the information processing device 10, that is, the response ID. The ID selecting circuit 386 supplies the selected response ID ($ID_A$) to the noise removal circuit 388 or the extracting circuit 392. For example, the ID selecting circuit 386 receives the measurement target included in the electronic device 100 or the number of the measurement target included in the electronic device 100 specified by the host 500 or the user (not shown). For example, when the ID selecting circuit 386 receives the number of the measurement target, the ID selecting circuit 386 selects all responses corresponding to the number of the measurement target from among the stored plurality of responses. Then, the ID selecting circuit 386 generates the response ID of the number of the measurement target by connecting all the responses. When the ID selecting circuit 386 receives the number of the measurement target, the ID selecting circuit 386 selects the response ID ($ID_A$) corresponding to the number of the measurement target from among the plurality of stored response IDs and supplies the $ID_A$ to the noise removal circuit 388 or the extracting circuit 392. The ID selecting circuit 386 may be connected to the host 500. The ID selecting circuit 386 may include the arithmetic processing circuit and the memory circuit. The ID selecting circuit 386 may read the program from the memory circuit and perform processing by the arithmetic processing circuit based on the read program.

The noise removal circuit 388 removes the noise included in the supplied response ID. Specifically, when the noise removal circuit 388 is supplied with the $ID_A$ from the ID selecting circuit 386, the noise removal circuit 388 removes the noise included in the $ID_A$. Since the $ID_A$ may contain noise, the noise removal circuit 388 may be provided in the PUF-ID extracting circuit 380 to allow the noise removal circuit 388 to generate a noise canceled ID ($ID_B$). For example, when the response and the response ID are used for a secret key such as encryption, noise removal is indispensable. Therefore, providing the noise removal circuit 388 in the PUF-ID extracting circuit 380 is an effective means for removing noise from the response and the response ID. The noise removal circuit 388 supplies the $ID_B$ to the encryption circuit 390 or the extracting circuit 392. The noise removal circuit 388 may be connected to the host 500.

The encryption circuit 390 encrypts the supplied response ID. Specifically, the encryption circuit 390 is supplied with the $ID_B$ from the noise removal circuit 388, and the encryption circuit 390 encrypts the $ID_B$ and generates an encrypted ID ($ID_C$). For example, when the response and the response ID are used for a secret key such as encryption, providing the noise removal circuit 388 in the encryption circuit 390 is an effective means for encrypting the response and the response ID. The encryption circuit 390 supplies the $ID_C$ to the extracting circuit 392. The encryption circuit 390 may be connected to the host 500. For example, the encryption circuit 390 encrypts the supplied $ID_B$ with other IDs (secret keys) with noise removed to generate the $ID_C$. For example, the encryption circuit 390 may encrypt the supplied $ID_B$ with a hash function to generate the $ID_C$.

The extracting circuit 392 extracts at least one ID from the supplied $ID_A$, $ID_B$ or $ID_C$ and supplies the extracted ID to the host 500 or the user. For example, the extracting circuit 392 extracts the $ID_A$ and supplies the $ID_A$ to the host 500 or the user.

The host 500 may have the function of the extracting circuit 392. When the host 500 has the function of the extracting circuit 392, the ID selecting circuit 386 supplies the $ID_A$ to the host 500 or the user, the noise removal circuit 388 supplies the $ID_B$ to the host 500 or the user, and the encryption circuit 390 supplies the $ID_C$ to the host 500 or the user.

To promote understanding of the information processing device 10, in the information processing device 10 shown in FIG. 1, the inputs from the electronic device 100 to the integrated circuit 300, the inputs from the integrated circuit 300 to the electronic device 100, and the inputs and outputs between the integrated circuit 300 and the host 500 are shown to be one, but a plurality of signals, voltages, or information may be input or output in parallel between the devices.

The configuration of the information processing device 10 according to an embodiment of the present invention shown in FIGS. 1 and 2 is an example, and is not limited to this configuration. It is sufficient that the unique ID to the information processing device 10 can be obtained by acquiring the characteristics of the elements included in the electronic device 100 multiple times, averaging the acquired characteristics by the averaging circuit 350, and processing by the PUF-ID extracting circuit 380. Alternatively, it is sufficient that the unique ID to the information processing device 10 may be obtained by acquiring the characteristics of the plurality of elements included in the electronic device 100, averaging the acquired characteristics by the averaging circuit 350, and processing by the PUF-ID extracting circuit 380.

In the information processing device 10 according to an embodiment of the present invention, by providing the PUF-ID extracting circuit 380, it is possible to generate the unique ID to the information processing device 10 such as the ID of the measurement target included in the electronic device 100 or the number of the measurement target included in the electronic device 100 included in the information processing device 10 using the characteristics of the electronic device 100. The information processing device 10 according to an embodiment of the present invention can generate the response ID by the PUF-ID extracting circuit 380 and provide the generated response ID to the host 500 when an inquiry about the response ID is received from the host 500. Therefore, the information processing device 10 according to an embodiment of the present invention does not generate the response ID unless there is an inquiry of the response ID from the host 500, so that it is difficult to steal or forge an ID compared with the information processing device in which a non-volatile memory is mounted and unique information such as a secret key or an ID is always stored in the non-volatile memory. As a result, the information processing device 10 according to an embodiment of the present invention can prevent the manufacture of an imitation product. Therefore, the information processing device 10 according to an embodiment of the present invention is less susceptible to ID theft or ID counterfeiting than a device that implements non-volatile memory and stores unique information such as a secret key or an ID in the non-volatile memory. As a result, the information processing device 10 according to an embodiment of the present invention can prevent the manufacture of an imitation product.

Figure 3:
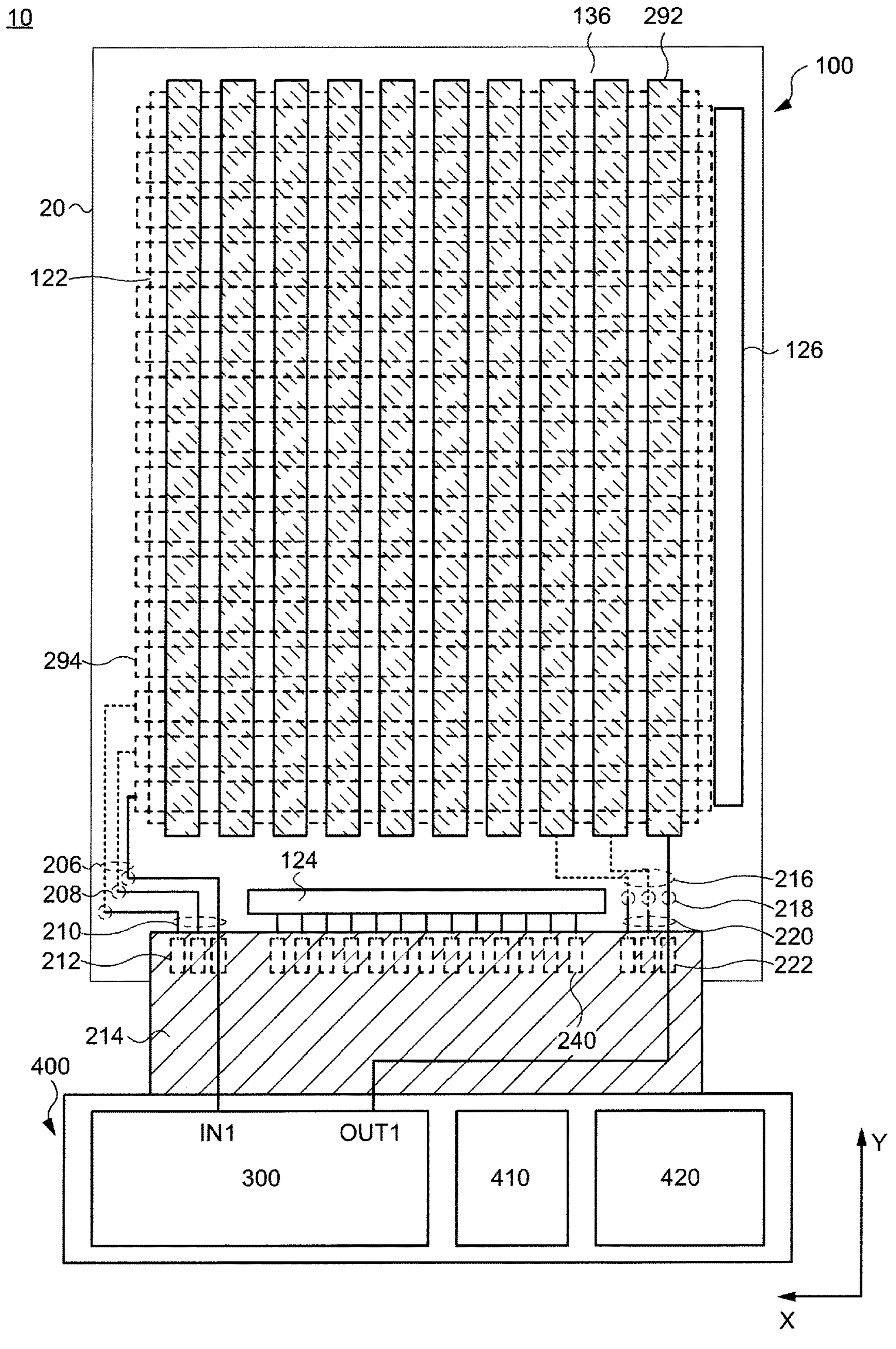
FIG. 3 is a plan view showing a configuration of an information processing device according to an embodiment of the present invention.

FIG. 3 is a plan view showing a part of the configuration of the information processing device 10 according to an embodiment of the present invention. In an embodiment of the present invention, an example in which the electronic device 100 is a touch panel having touch electrodes will be described. Description of the same or similar components as those of FIG. 1 or FIG. 2 may be omitted.

As shown in FIG. 3, the information processing device 10 includes the electronic device 100, a circuit board 400, and a connector 214.

The electronic device 100 includes a plurality of first touch electrodes 294 arranged in parallel to the X-direction (row direction) in a top view, a plurality of second touch electrodes 292 arranged in parallel to the Y-direction (column direction) in a top view, a first substrate 20, a display section 122, a peripheral section 136, a video signal line drive circuit 124, and a scan signal line drive circuit 126. For example, when the touch panel has tx first touch electrodes 294 and ty second touch electrodes 292, the coordinates of the intersection of the first touch electrode 294 and the second touch electrode 292 (tx, ty) are defined as the address of the txth first touch electrode 294 and the tyth second touch electrode 292. Tx and ty are natural numbers. The electronic device 100 may have the scan signal line drive circuit on the left and right sides in a top view.

The electronic device 100 may be a touch panel alone as described above, or may be a device capable of displaying an image. As will be described in detail later, the electronic device 100 may be a liquid crystal display device, a self-luminous display device, or an electrophoresis display device. The self-luminous display device is, for example, an Electroluminescence (EL) display device or micro LED display device.

The display section 122 has a plurality of pixel circuits. Details of the pixel circuit will be described later. The video signal line drive circuit 124 and the scan signal line drive circuit 126 are provided in the peripheral section 136. The video signal line drive circuit 124 is provided, for example, in parallel or substantially parallel to the Y-direction at positions adjacent to each other. The scan signal line drive circuit 126 is provided, for example, in parallel or substantially parallel to the X-direction at positions adjacent to each other. The video signal line drive circuit 124 and the scan signal line drive circuit 126 control driving of the pixels. In FIG. 3, an example in which the video signal line drive circuit 124 and the scan signal line drive circuit 126 use an IC-chip is shown. In FIG. 3, an example in which the video signal line drive circuit 124 and the scan signal line drive circuit 126 are provided above the first substrate 20 is shown, but is not limited to this example. For example, a drive circuit formed on a substrate (semiconductor substrate and the like) different from the first substrate 20 may be provided on the first substrate 20 or the connector 214 of a flexible printed circuit (FPC). A part or all of the circuit included in the video signal line drive circuit 124 and the scan signal line drive circuit 126 may be formed on a substrate different from the first substrate 20 and provided on the first substrate 20 or the connector 214. The drive circuit included in the scan signal line drive circuit 126 or a part of the drive circuit may be formed directly on the first substrate 20. A plurality of display elements provided in the pixel, and various semiconductor elements for controlling them are formed on the first substrate 20. The display element is, for example, a liquid crystal device.

The electronic device 100 also includes a first wiring 206, a contact hole 208, a first terminal wiring 210, a first terminal 212, a second wiring 216, a contact hole 218, a second terminal wiring 220, and a second terminal 222. These are also provided on the first substrate 20.

For example, the first touch electrode 294 is electrically connected to the first wiring 206 extending from the peripheral section 136. A signal or power supply for driving the pixel may be provided to the pixel from the external device (not shown) via the first terminal 212, the video signal line drive circuit 124, or the scan signal line drive circuit 126. The first wiring 206 is extended in the peripheral section 136 and electrically connected to the first terminal wiring 210 via the contact hole 208. The first terminal wiring 210 is exposed near an end portion of the electronic device 100 on the side where a terminal electrode 240 is provided to form the first terminal 212. The first terminal 212 is connected to the connector 214.

For example, the second touch electrode 292 is electrically connected to the second wiring 216 extending from the peripheral section 136. A signal or power supply for driving the pixel may be supplied to the pixel via the external device (not shown) and the second wiring 216 extending from the peripheral section 136. The second wiring 216 is extended from the peripheral section 136 and electrically connected to the second terminal wiring 220 via the contact hole 218. The second terminal wiring 220 is exposed near the end portion of the electronic device 100 on the side where the terminal electrode 240 is provided to form the second terminal 222. The second terminal 222 is connected to the connector 214.

The first terminal 212 or the second terminal 222 may be formed in a line along one side of the electronic device 100. For this reason, the single connector 214 can be used to supply a signal for touch detection and a signal when a touch is performed to the first touch electrode 294 and the second touch electrode 292, and to supply a voltage or signal to each of the display section 122, the video signal line drive circuit 124, and the scan signal line drive circuit 126.

The circuit board 400 includes, for example, the integrated circuit 300, a signal supply circuit 410, and a power supply circuit 420. The circuit board 400 is electrically connected to the electronic device 100 via the connector 214.

The signal supply circuit 410 generates a signal supplied to a display panel. The signal supplied to the display panel is, for example, a video signal or a timing signal for controlling the operation of the circuit. The power supply circuit 420 supplies power to the integrated circuit 300 and the signal supply circuit 410. The connector 214 supplies the video signal, the timing signal for controlling the operation of the circuit, and the power supply to the display section 122, the video signal line drive circuit 124, and the scan signal line drive circuit 126.

For example, when the electronic device 100 is a touch panel having touch electrodes, the signal generating circuit 320 included in the integrated circuit 300 may generate one or more signals for touch detection. The generated signal may be a plurality of same signals, may be a plurality of signals different from each other, or may be a plurality of same signals and signals different from each other.

The driving of the touch panel will be briefly described with reference to the mutual capacitance method. For example, in the mutual capacitance method, when a finger of a person touches the electronic device 100, the capacitance generated between the finger of the person and the first touch electrode 294 and the second touch electrode 292 is subtracted from the parasitic capacitance of the first touch electrode 294 and the second touch electrode 292. By reading this change, the position at which the finger of the person touches the electronic device 100 is detected. The driving of the touch panel is not limited to this example. The touch panel may be driven by a self-capacitance method.

For example, when detecting the position where the finger of the person touches the electronic device 100, the user selects an application for detecting the touch position. When the user selects the application, the information processing device 10 selects the normal operation mode and operates the controller 370.

At this time, a signal (drive signal) for making a touch detection generated by the signal generating circuit 320 is supplied from an IN1 terminal of the integrated circuit 300 to the first touch electrode 294 via the connector 214, the first terminal 212, the first terminal wiring 210, the contact hole 208, and the first wiring 206. For example, a signal (touch signal) based on a change when the touch panel is touched by a person is supplied from the second touch electrode 292 to an OUT1 terminal of the integrated circuit 300 via the second wiring 216, the contact hole 218, the second terminal wiring 220, the second terminal 222, and the connector 214. Alternatively, a signal (non-touch signal) where the intersection of the first touch electrode 294 and the second touch electrode 292 is not touched is supplied from the second touch electrode 292 to the OUT1 terminal of the integrated circuit 300 via the second wiring 216, the contact hole 218, the second terminal wiring 220, the second terminal 222, and the connector 214. The signal supplied to the OUT1 terminal is converted into an averaged digital signal via the integrator circuit 330, the S/H circuit and AD converter 340, and the averaging circuit 350, and stored in the memory circuit 360. Then, the controller 370 detects the position where the finger of the person touches the electronic device 100.

For example, when the user detects the touch position and selects an application that generates the unique identifier (ID) to the information processing device 10, the information processing device 10 selects the PUF operation mode. After processing of "the controller 370 detects the position where the finger of the person touches electronic device 100", the detected result is supplied to the PUF-ID extracting circuit 380. When detecting the position where the finger of the person touches the electronic device 100, the digital signal generated by the S/H circuit and AD converter 340 may be transferred directly from the S/H circuit and AD converter 340 directly to the controller 370 without passing through the averaging circuit 350 and the memory circuit 360.

1-2. Driving Method of Information Processing Device 10

Figure 4:
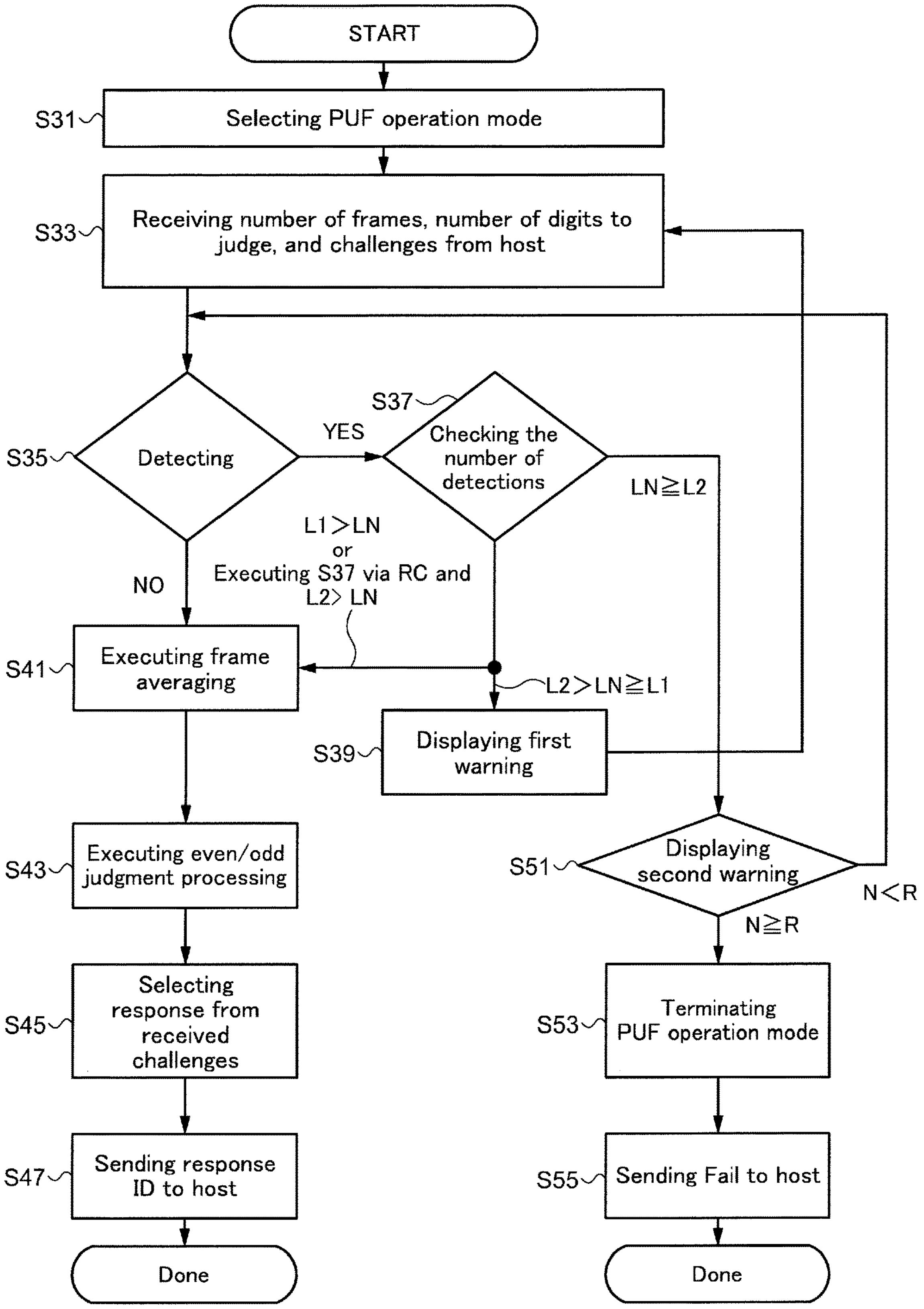
FIG. 4 is a flowchart showing a driving method of an information processing device according to an embodiment of the present invention.

A driving method of the information processing device 10 according to an embodiment of the present invention will be described with reference to FIG. 4. FIG. 4 is a flowchart showing a driving method of the information processing device 10 according to an embodiment of the present invention. Description of the same or similar components as those of FIGS. 1 to 3 may be omitted. In an embodiment of the present invention, an example in which the electronic device 100 is a touch panel having touch electrodes will be described.

When driving of the information processing device 10 is started, first, in step 31 (S31), a signal for selecting the PUF operation mode is transferred from the host 500 or the user to the integrated circuit 300. For example, the transfer of a signal may be referred to as the provision of a signal. The transfer of a signal may be referred to as the provision of a signal or the input of a signal. The signal may be a voltage.

Next, in Step 33 (S33), the number of frames to be averaged, the number of digits or bits of the digital signal for judging an even number or odd number, and the addresses (challenges) of the first touch electrode 294 and the second touch electrode 292 are transferred from the host 500 or the user to the integrated circuit 300. The number of frames to be averaged, the number of digits or bits of the digital signal for judging an even number or odd number, and the addresses of the first touch electrode 294 and the second touch electrode 292 are stored in the memory circuit (not shown) of the integrated circuit 300 and set. The number of digits or bits of the digital signal for judging an even number or odd number means, for example, that when the element number included in the electronic device 100 is an 8-bit digital signal, it is the fourth digit (fourth bit) of the 8-bit digital signal. In this specification and the like, the signal, an element for outputting a voltage, a number indicating the measurement target, or coordinates are referred to as a challenge. The signal, the element for outputting a voltage, the number indicating the measurement target, or the coordinates indicating the measurement target are, for example, an address between the first touch electrode and the second touch electrode, an address of the pixel circuit included in the display device, or an address indicating the number of a storage element included in the memory circuit. The challenge may be one or two.

The number of frames to be averaged, and the number of digits or bits of the digital signal for judging an even number or odd number are appropriately set depending on the use or specifications of the response ID.

Next, in step 35 (S35), the information processing device 10 detects whether the touch panel is touched by a person. In step 31 (S31), since the PUF operation mode is selected, the controller 370 and the PUF-ID extracting circuit 380 are driven. To detect whether the touch panel is touched by a person, the touch signal or the non-touch signal is sent from the electronic device 100 via the OUT1, processed by the integrator circuit 330, the S/H circuit and AD converter 340, and the averaging circuit 350, and stored in the memory circuit 360. The controller 370 reads the processed touch signal or non-touch signal from the memory circuit 360. The controller 370 detects the touch position by processing the read signal. For example, when the touch signal is processed, the controller 370 detects the addresses of the first touch electrode 294 and the second touch electrode 292 indicating the position touched by the user (YES). When the controller 370 processes the non-touch signal, the controller 370 detects that "the user is not touching the panel" (NO). The drive associated with NO is described below.

If YES, the controller 370 checks the detection count in step 37 (S37). The controller 370 here calculates the number of the detected touch position.

When the detection number is LN, and LN is L1 or more and less than L2, the controller 370 supplies a display control signal to the signal supply circuit 410. LN, L1, and L2 are natural numbers, and L2 is larger than L1. The signal supply circuit 410 supplies image data associated with a first warning to the display section 122. The display section 122 displays an image associated with the first warning, and the information processing device 10 again executes step 33 (S33). The display of the warning is, for example, "the screen should not be touched". The above step is step 39 (S39).

For example, in this specification, the drive in which the information processing device 10 executes step 33 (S33) again from step 39 (S39) is referred to as Repeat Challenge (RC). When returning from step 39 (S39) to drive in step 33 (S33) and the information processing device 10 continues to be driven, the information processing device 10 may send a signal requesting a change (change of challenge) in the address between the first touch electrode 294 and the second touch electrode 292, and an address (detection address) between the first touch electrode 294 and the second touch electrode 292 corresponding to the detected touch position to the host 500. For example, when the host 500 accepts the signal requesting a change of the challenge, and the detection address, the addresses of the first touch electrode 294 and the second touch electrode 292 in which the touch position is not detected may be sent to the information processing device 10 as the challenge. For example, the address of the first touch electrode 294 and the address of the second touch electrode 292 excluding the address around the detection address may be sent to the information processing device 10 as the challenge.

In step 37 (S37), if the detection number LN is smaller than L1, or if S37 is executed via RC and the detection number LN is smaller than L2, the controller 370 executes step 41 (S41). Step 41 (S41) will be described later. When the detected number LN is L2 or more in step 37 (S37), the controller 370 executes step 51 (S51). Step 51 (S51) will be described later.

In step 51 (S51), the signal supply circuit 410 supplied the display section 122 with image data associated with a second warning. The display section 122 displays an image associated with the second warning. Similar to the first warning, the display of the warning is, for example, "the screen should not be touched". The number of times the warning is displayed is N, and the number of times set in advance is R. N and R are natural numbers. When N is smaller than R, step 33 (S33) is executed again. When N is R or more, the PUF operation mode is terminated (Step 53 (Step S53)). In addition, a signal indicating that the PUF operation mode has been terminated is sent from the integrated circuit 300 to the host 500 (step 55 (S55)). That is, a Fail signal is transmitted from the integrated circuit 300 to the host 500. Then, the operation of the information processing device 10 is completed.

If NO in step 35 (S35), the frame average processing circuit 382 executes frame averaging processing in step 41 (S41). For example, a signal in which the intersection of the first touch electrode 294 and the second touch electrode 292 is not touched (non-touch signal) is input to the integrator circuit 330, and is converted into the digital signal by the S/H circuit and AD converter 340. For example, when the S/H circuit and AD converter 340 has a 12-bit AD conversion circuit, the non-touch signal is converted into a 12-bit digital signal. That is, when expressed in a decimal system, the non-touch signal takes any one value from 1 to 4096. At this time, the averaging circuit 350 acquires the non-touch signal multiple times in one frame and averages the acquired plurality of non-touch signals. For example, in step 33, when the number of frames to be averaged is set to 60, the non-touch signal is acquired multiple times in each of the 60 frames, and the acquired plurality of non-touch signals is averaged. The averaged signal in each of the 60 frames is stored in the memory circuit 360. Subsequently, the averaged signal in each of the 60 frames is transferred to the memory circuit 360 or the frame average processing circuit 382, and frame averaging processing is performed. The operation described above is performed at all addresses selected by the first touch electrode 294 and the second touch electrode 292. The above step is step 41 (S41).

Subsequently, even-odd number judgment processing is executed by the judgment circuit 384 in step 43 (S43). For example, in Step 33, when the number of digits of the digital signal for determining the even number or odd number is set to the second digit, the second digit is 0 when the frame averaging processed digital signal is 2000 in a decimal system. Therefore, the judgment circuit 384 determines that 2000 is an even number, and sets the judgment result to 0. 0, which is the judgment result, is the response of the addresses corresponding to the processed digital signal. The judgment circuit 384 may store the response in the memory circuit included in the judgment circuit 384. The judgment circuit 384 may supply the response to the ID selecting circuit 386. The operation described above is executed in all digital signals that have been frame averaging processed. The above step is step 43 (S43).

Subsequently, in step 45 (S45), the response ID ($ID_A$) is generated by the ID selecting circuit 386. For example, it is assumed that a plurality of addresses of the first touch electrode 294 and the second touch electrode 292 is set in step 33. That is, it is assumed that a plurality of challenges is set in step 33. The ID selecting circuit 386 is supplied with a plurality of responses from the judgment circuit 384, the plurality of responses is assumed to be stored in the memory circuit included in the ID selecting circuit 386. The ID selecting circuit 386 reads (selects) the response corresponding to each of the plurality of challenges from the memory circuit. The ID selecting circuit 386 generates the response ID by connecting all the read responses. For example, in step 33, eight addresses of the first touch electrode 294 and the second touch electrode 292 are set, and the responses are set to 0, 0, 1, 1, 1, 1, 1, and 0 for each address. The ID selecting circuit 386 reads the responses 0, 0, 1, 1, 1, 1, 1, and 0 from the memory circuit and connects them to generate 00111110, which is the $ID_A$. The ID selecting circuit 386 supplies the $ID_A$ to the noise removal circuit 388 and the extracting circuit 392.

In step 45 (S45), a response $ID_B$ is generated by the noise removal circuit 388. When the noise removal circuit 388 is supplied with the $ID_{AA}$ from the ID selecting circuit 386, the noise removal circuit 388 removes noise contained in the $ID_A$. The noise removal circuit 388 generates a noise-removed ID ($ID_B$) from the $ID_A$. The noise removal circuit 388 supplies the $ID_B$ to the encryption circuit 390 and the extracting circuit 392. In step 45 (S45), a response ID ($ID_C$) is generated by the encryption circuit 390. When the encryption circuit 390 is supplied with the $ID_B$ from the noise removal circuit 388, the encryption circuit 390 encrypts the $ID_B$ and generates an encrypted ID ($ID_C$). The encryption circuit 390 supplies the $ID_C$ to the extracting circuit 392.

Subsequently, in step 47 (S47), when the extracting circuit 392 receives the $ID_A$, $ID_B$, and $ID_C$, the extracting circuit 392 extracts at least one ID from the $ID_A$, $ID_B$ or $ID_C$. The extracting circuit 392 supplies the extracted ID to the host 500 or the user. For example, the extracting circuit 392 extracts the $ID_A$ and sends the $ID_A$ to the host 500 or user. At this time, the response ID may be registered in the host 500 or the user. Then, the operation of the information processing device 10 is completed.

As described above, in the information processing device according to an embodiment of the present invention, by providing the PUF-ID extracting circuit, for example, the unique ID to the information processing device can be generated by using the signals when the touch electrodes included in the information processing device are not touched. The information processing device according to an embodiment of the present invention can generate the unique ID to the information processing device based on the signals with suppressed noise and variations by executing averaging processing in the integrated circuit having the PUF-ID extracting circuit. Further, the information processing device according to an embodiment of the present invention can generate the unique ID to the information processing device based on the signals with suppressed noise and variations by executing averaging processing also in the PUF-ID extracting circuit. Therefore, the information processing device according to an embodiment of the present invention can generate the unique ID with high accuracy by using the characteristics of the semiconductor device included in the information processing device. Therefore, the information processing device including the integrated circuit having the PUF-ID extracting circuit according to an embodiment of the present invention can prevent the manufacture of an imitation product.

2. Second Embodiment

An information processing device 10B according to an embodiment of the present invention will be described with reference to FIGS. 5 and 6. In an embodiment of the present invention, the information processing device 10B includes a liquid crystal display device 100B. In an embodiment of the present invention, the information processing device 10B generates the response ID of the information processing device 10B by utilizing the characteristics of the pixel circuit included in the liquid crystal display device 100B. Description of the same or similar components as those of FIGS. 1 to 4 may be omitted.

2-1. Configuration of Information Processing Device 10B

Figure 5:
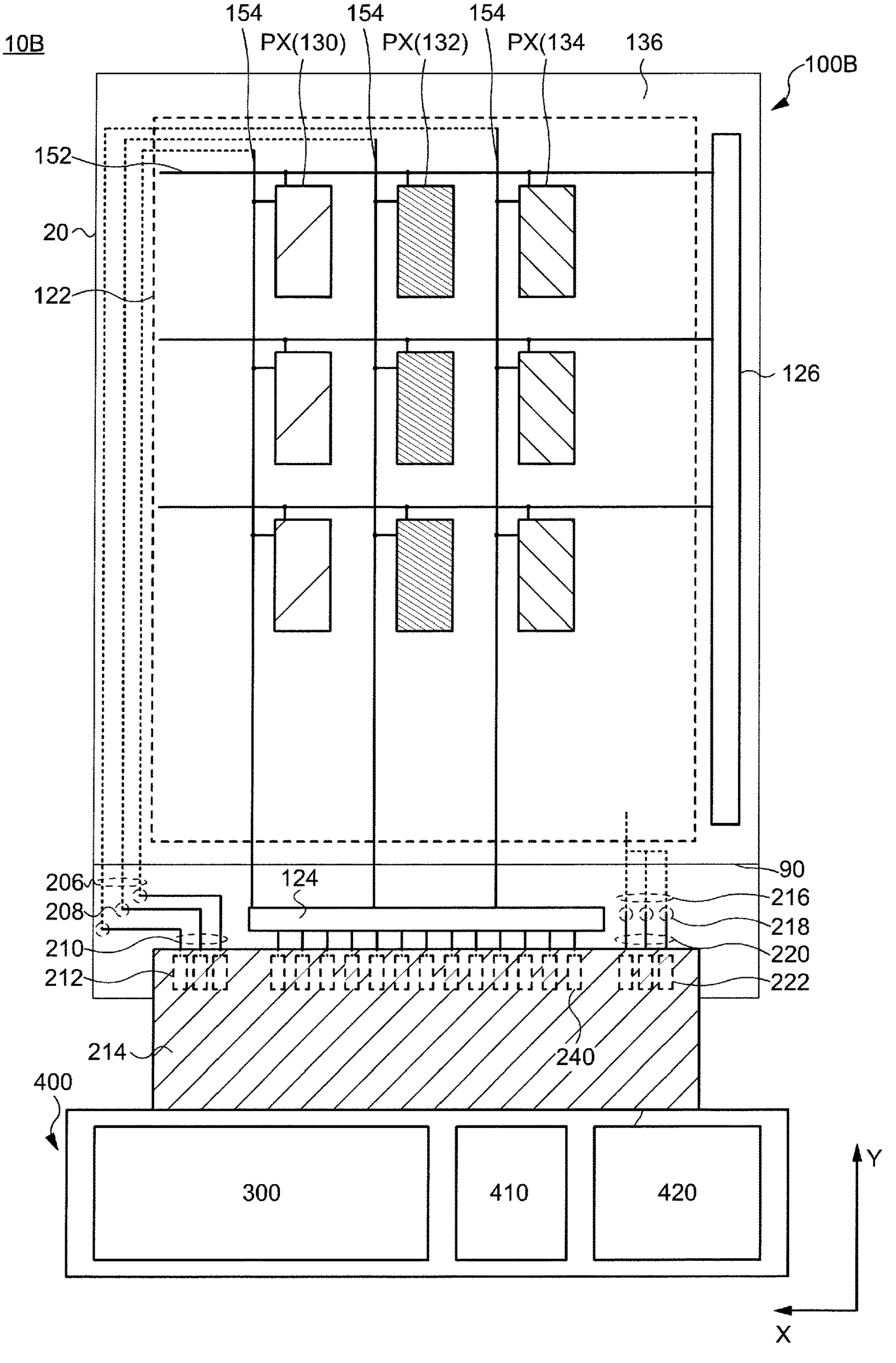
FIG. 5 is a plan view showing a configuration of an information processing device according to an embodiment of the present invention.

FIG. 5 is a schematic plan view showing a configuration of the information processing device 10B according to an embodiment of the present invention. As compared with FIG. 1, FIG. 5 shows an example in which the electronic device 100 is the liquid crystal display device 100B. The same or similar components as those of FIGS. 1 to 4 will not be described here.

As shown in FIG. 5, in addition to the configuration shown in FIG. 1, the liquid crystal display device 100B includes at least a seal portion (not shown) and a second substrate 90. The first substrate 20 and the second substrate 90 are bonded to each other by the seal portion. Generally, the display section 122 is surrounded by the seal portion. In the display section 122, a plurality of pixel circuits PXA is arranged in a matrix.

In the example shown in FIG. 5, the arrangement of the plurality of pixel circuits PXA is a striped array. Each of the plurality of pixel circuits PXA, for example, may correspond to three sub-pixels 130, 132, and 134. One pixel may be formed by three sub-pixels. The pixel circuit PXA is the smallest unit constituting a part of an image to be reproduced on the display section 122. Each sub-pixel is equipped with one display element. In the example shown in FIG. 5, the display element is a liquid crystal element. The color corresponding to the sub-pixel is determined by the characteristics of the liquid crystal element or a color filter provided on the sub-pixel.

In a striped array, three sub-pixels 130, 132, and 134 can be configured to have different colors from each other. For example, each of the sub-pixel 130, the sub-pixel 132, and the sub-pixel 134 may include a color filter layer that emits three primary colors of red, green, and blue. Then, any voltage or current is supplied to each of the three sub-pixels, and the liquid crystal display device 1006 can display an image.

The video signal line drive circuit 124 is connected to one end of a plurality of video signal lines 154. The plurality of video signal lines 154 is connected to the plurality of pixel circuits PXA arranged in the Y-direction. The scan signal line drive circuit 126 is connected to one end of a plurality of scan signal lines 152. The plurality of scan signal lines 152 is connected to the plurality of pixel circuits PXA arranged in the X-direction.

The video signal line drive circuit 124 receives the video signal from a plurality of terminal electrodes 240. The scan signal line drive circuit 126 selects the scan signal line 152, and a voltage corresponding to the video signal is written to the pixel circuit PXA connected to the selected scan signal line 152. As a result, an image is displayed on the display section 122.

For example, the other end of the plurality of video signal lines 154 may be electrically connected to the first wiring 206 extending from the peripheral section 136. The first wiring 206 is extended in the peripheral section 136 and electrically connected to the first terminal wiring 210 via the contact hole 208. The first terminal wiring 210 is exposed near the end portion of the liquid crystal display device 100B on the side where the terminal electrode 240 is provided to form the first terminal 212. The first terminal 212 is connected to the connector 214.

For example, the video signal line drive circuit 124 and the scan signal line drive circuit 126 may be electrically connected to the second wiring 216 extending from the peripheral section 136. The second wiring 216 extends from the peripheral section 136 and is electrically connected to the second terminal wiring 220 via the contact hole 218. The second terminal wiring 220 is exposed near the end portion of the liquid crystal display device 100B on the side where the terminal electrode 240 is provided to form the second terminal 222. The second terminal 222 is connected to the connector 214. A signal or power supply for driving the pixel may be supplied from the external device (not shown) to the pixel via the second terminal 222.

In the liquid crystal display device 100B according to an embodiment of the present invention, when the normal operation mode is selected by the mode selecting circuit 310, for example, the scan signal line 152 is selected, and the potential written to the pixel is read to the video signal line 154. Furthermore, the data written to the pixel by the controller 370 may be corrected based on the read potential, and the corrected data may be fed back to each pixel.

Similar to the electronic device 100, the liquid crystal display device 100B according to an embodiment of the present invention includes the first touch electrode 294 and the second touch electrode 292, and may generate and select the response ID of the information processing device 10B based on the addresses of the first touch electrode 294 and the second touch electrode 292. Furthermore, the information processing device 10B according to an embodiment of the present invention may generate and select two response IDs, which are the response ID based on the pixel circuit PXA and the response ID based on the addresses of the first touch electrode 294 and the second touch electrode 292. Data leakage can be further reduced by allowing the PUF-ID extracting circuit to generate and select the two response IDs.

2-2. Configuration of Pixel Circuit PXA

Figure 6:
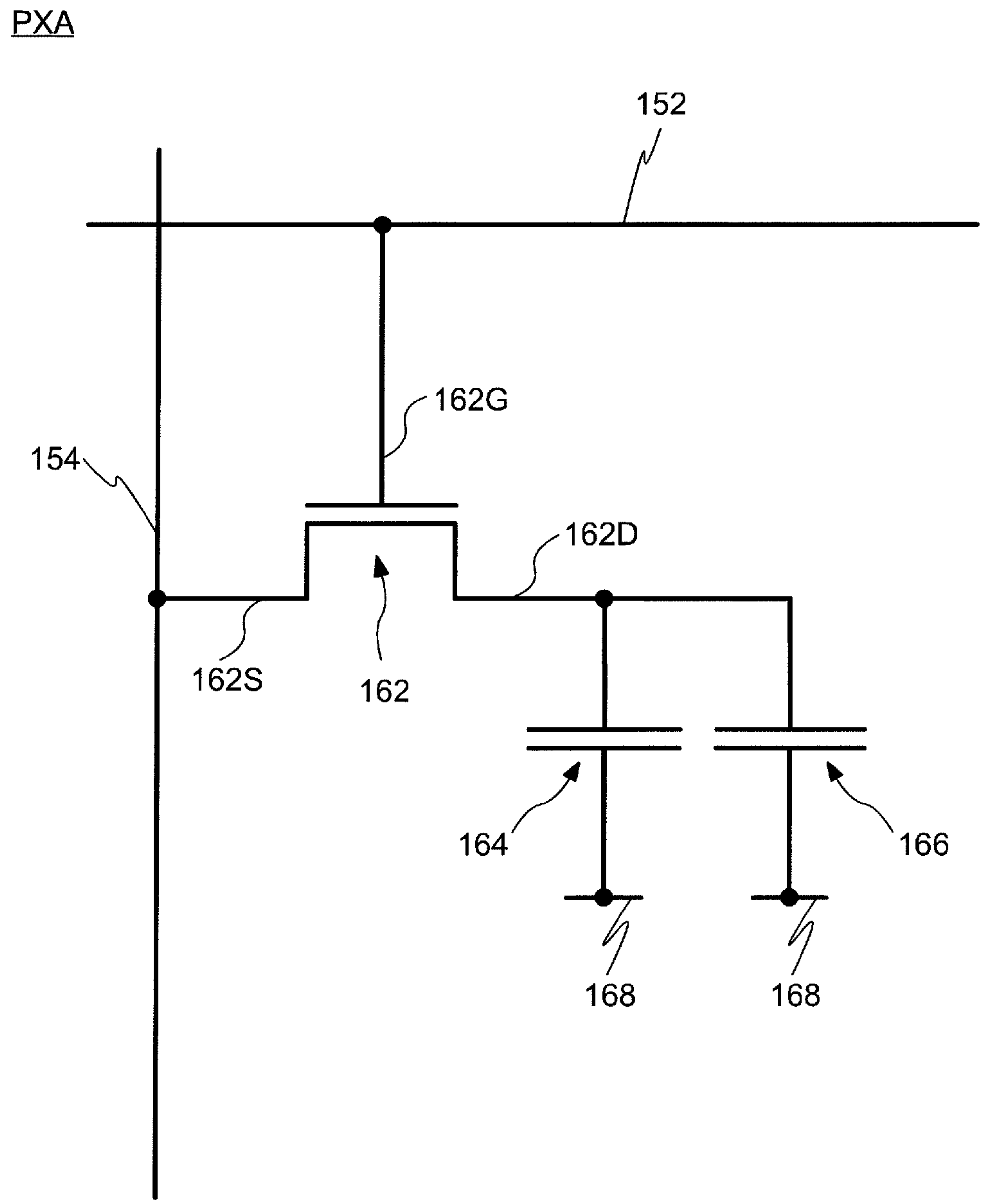
FIG. 6 is a circuit diagram showing a pixel circuit according to an embodiment of the present invention.

FIG. 6 is a circuit diagram showing the pixel circuit PXA according to an embodiment of the present invention. Description of the same or similar components as those of FIGS. 1 to 5 will be omitted. As shown in FIG. 6, the pixel circuit PXA includes elements such as a transistor 162, a storage capacitor 164 and a liquid crystal element 166. The transistor 162 includes a gate electrode 162G, a source electrode 162S, and a drain electrode 162D. The gate electrode 162G is connected to the scan signal line 152. The source electrode 162S is connected to the video signal line 154. The drain electrode 162D is connected to one end of the storage capacitor 164 and one end of the liquid crystal element 166. The other end of the storage capacitor 164 and the other end of the liquid crystal element 166 are connected to, for example, a reference power line 168. The reference power line 168 is provided in common to the plurality of pixel circuits PXA. A constant potential is applied to the reference power line 168 from, for example, a plurality of second terminals 222. The constant potential is, for example, 0V. The reference power line 168 is sometimes referred to as, for example, a common power supply line. One end of the storage capacitor 164 or one end of the liquid crystal element 166 connected to the reference power line 168 is also referred to as a common electrode. Depending on the voltage applied to the source electrode 162S and the drain electrode 162D, the function of each electrode as the source and drain may be interchanged.

The circuit configuration of the pixel circuit PXA is merely an example, and is not limited thereto. Since the pixel circuit PXA can be driven by a commonly used driving method of a liquid crystal display device, the description thereof is omitted.

2-3. Driving Method of Information Processing Device 10B

A flowchart shown in FIG. 4 can be used to drive the information processing device 10B according to an embodiment of the present invention. In the driving method of the information processing device 10B according to an embodiment of the present invention, an example in which the addresses of the first touch electrode 294 and the second touch electrode 292 in the description of FIG. 4 are replaced with the address of the pixel circuit PXA, and the response ID of the information processing device 10B is generated by utilizing the characteristics of the transistor 162 included in the pixel circuit PXA is shown. Description of the same or similar components as those of FIGS. 1 to 6 will be omitted.

The driving of the information processing device 10B is started. Step 31 (S31) is the same as the description of FIG. 4, and the description here is omitted.

Next, in Step 33 (S33), the number of frames to be averaged, the number of digits or bits of the digital signal for judging an even number or odd number, and the addresses of the pixel circuit PXA are transferred from the host 500 or the user to the integrated circuit 300. Each pixel circuit PXA is initialized. The initialization here includes uniformly converting the image data written in each pixel circuit PXA into the same data. Specifically, it includes writing a voltage corresponding to 0V or black to each pixel circuit PXA. By the initialization, the characteristic of each pixel circuit PXA can be set to a state in which the same data is written. When coordinates of the pixel circuit PXA provided at a position where the n scan signal line 152 arranged in parallel to the X-direction in a top view and the m video signal line 154 arranged in parallel to the Y-direction in a top view intersect are referred to as coordinates (n, m), and the coordinates (n, m) are referred to as an address of the pixel circuit PXA. The numerical values n and m are natural numbers, respectively. Since the description other than what is described here is the same as the description of step 33 (S33) of FIG. 4, the description thereof is omitted.

Next, in step 35 (S35), the information processing device 10 detects whether the address of the pixel circuit PXA is output. In step 31 (S31), since the PUF operation mode is selected, the controller 370 and the PUF-ID extracting circuit 380 are driven. To detect whether the address of the pixel circuit PXA is output, the address signal or address non-detection signal is sent from the electronic device 100 via the OUT1, processed by the integrator circuit 330, the S/H circuit and AD converter 340, and the averaging circuit 350, and stored in the memory circuit 360. The controller 370 reads the processed address signal or the addressed non-detection signal from the memory circuit 360. The controller 370 detects the address by processing the read signal. For example, when the controller 370 processes the address signal, the address of the pixel circuit PXA (YES) is detected. When the controller 370 processes the address non-detection signal, the controller 370 detects that "the address of the pixel circuit PXA is not output" (NO). The drive associated with NO is described below.

If YES, the controller 370 confirms the detection number in step 37 (S37). The controller 370 here calculates the number of addresses of the detected pixel circuit PXA (the number of addresses of the pixel circuit PXA). Since the description other than what is described here is the same as the description of step 37 (S37) of FIG. 4, the description thereof is omitted.

Step 39 (S39) is the same as the description of FIG. 4, and the description here is omitted. When returning from step 39 (S39) to step 33 (S33) and the information processing device 10 continues to be driven, the information processing device 10 may send a signal requesting a change of the address of the pixel circuit PXA (change of challenge), and the address of the detected pixel circuit PXA (detection address) to the host 500. For example, when the host 500 accepts the signal requesting a change of the challenge and the detection address, the address of an undetected pixel circuit PXA may be sent to the information processing device 10 as the challenge. For example, the address of the pixel circuit PXA excluding the address around the detection address may be sent to the information processing device 10 as the challenge.

Step 51 (S51), step 53 (S53), and step 55 (S55) are the same as those in FIG. 4, and therefore a description thereof is omitted here.

If NO in step 35 (S35), the information processing device 10B executes step 41 (S41). In step 41 (S41), frame averaging processing is executed by the frame average processing circuit 382. Specifically, the address of the undetected pixel circuit PXA is selected, the voltage written in the selected pixel circuit PXA is read, the read voltage (first voltage) is input to the integrator circuit 330, and it is converted into the digital signal by the S/H circuit and AD converter 340. For example, when the S/H circuit and AD converter 340 have a 12-bit AD conversion circuit, the first voltage is converted into a 12-bit digital signal. That is, when expressed in a decimal system, the first voltage takes any one value from 1 to 4096. At this time, the averaging circuit 350 acquires a first voltage multiple times in one frame and averages the acquired plurality of first voltages. For example, in step 33, when the number of frames to be averaged is set to 60, in each of the 60 frames, the first voltage is acquired multiple times, and the acquired first voltage is averaged. The averaged signal in each of the 60 frames is stored in the memory circuit 360. Subsequently, the averaged signal in each of the 60 frames is transferred to the memory circuit 360 or the frame average processing circuit 382, and the frame averaging process is performed. The operation described above is performed at the addresses of all the pixel circuits PXA to be selected. The above step is step 41 (S41).

Subsequently, Step 43 (S43), Step 45 (S45), and Step 47 (S47) are executed by replacing the addresses of the first touch electrode 294 and the second touch electrode 292 with the address of the pixel circuit PXA. Otherwise, the description is the same as that of FIG. 4, and therefore, the description is omitted here.

As described above, in the information processing device according to an embodiment of the present invention, by providing the PUF-ID extracting circuit, for example, the characteristic of the pixel circuit included in the information processing device can be utilized to generate the unique ID to the information processing device. Therefore, the information processing device including the integrated circuit having the PUF-ID extracting circuit according to an embodiment of the present invention can prevent the manufacture of an imitation product.

3. Third Embodiment

An information processing device 100 according to an embodiment of the present invention will be described with reference to FIGS. 7 and 8. In an embodiment of the present invention, the information processing device 100 includes an EL display device 100C. In an embodiment of the present invention, the information processing device 100 generates a response ID of the information processing device 10C by utilizing the characteristics of the pixel circuit included in the EL display device 100C. Description of the same or similar components as those of FIGS. 1 to 6 may be omitted.

3-1. Configuration of Information Processing Device 100

Figure 7:
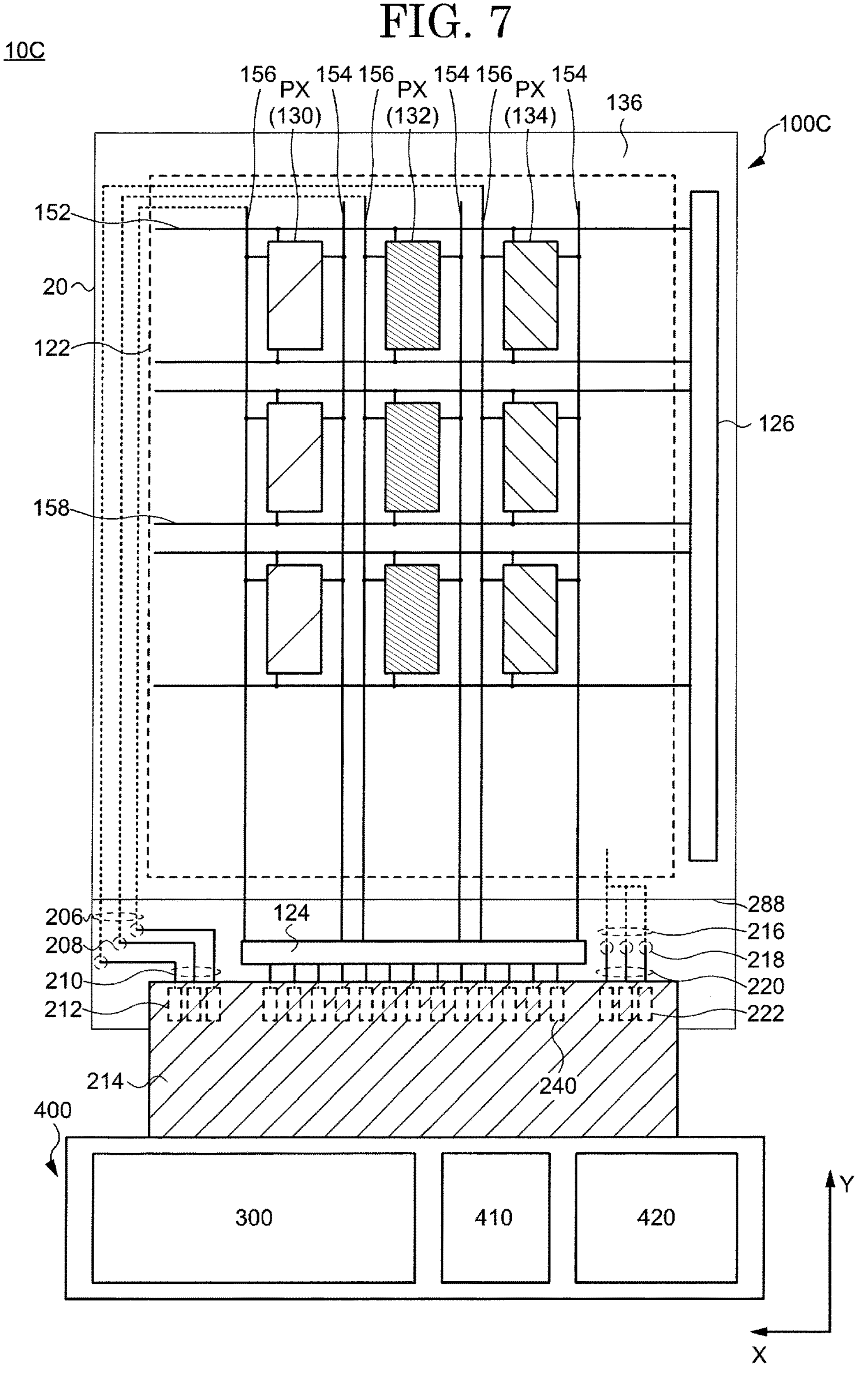
FIG. 7 is a plan view showing a configuration of an information processing device according to an embodiment of the present invention.

FIG. 7 is a schematic plan view showing a configuration of the information processing device 100 according to an embodiment of the present invention. As compared with FIG. 1, FIG. 7 shows an example in which the electronic device 100 is the EL display device 100C. Description of the same or similar components as those of FIGS. 1 to 6 will be omitted.

As shown in FIG. 7, in addition to the configuration shown in FIG. 1, the EL display device includes at least a seal portion (not shown) and a second substrate 288. The first substrate 20 and the second substrate 288 are bonded to each other by the seal portion.

In the example shown in FIG. 7, the display element provided for each sub-pixel is a light emitting element.

The video signal line drive circuit 124 is connected to one end of the plurality of video signal lines 154 and one end of a plurality of voltage measurement lines 156. The plurality of video signal lines 154 and the plurality of voltage measurement lines 156 are connected to a plurality of pixel circuits PXB arranged in the Y-direction. The scan signal line drive circuit 126 is connected to one end of the plurality of the scan signal lines 152, and one end of a plurality of control signal lines 158. The plurality of the scan signal lines 152 and the plurality of control signal lines 158 are connected to the plurality of pixel circuits PXB arranged in the X-direction.

For example, the other end of the plurality of voltage measurement lines 156 may be electrically connected to the first wiring 206 extending from the peripheral section 136. The first wiring 206 is extended in the peripheral section 136 and electrically connected to the first terminal wiring 210 via the contact hole 208. The first terminal wiring 210 is exposed near the end portion of the EL display device 100C on the side where the terminal electrode 240 is provided to form the first terminal 212. The first terminal 212 is connected to the connector 214.

Since the configuration of the information processing device 10C is the same as that of FIG. 5 except for the configuration described with reference to FIG. 7, the explanation thereof is omitted here.

Similar to the electronic device 100 and the liquid crystal device 100B, the EL display device 100C according to an embodiment of the present invention includes the first touch electrode 294 and the second touch electrode 292 and the liquid crystal display device 100B, and may generate and select the response ID of the information processing device 10C based on the addresses of the first touch electrode 294 and the second touch electrode 292. In addition, the information processing device 100 according to an embodiment of the present invention may generate and select two response IDs, which are the response ID based on the pixel circuit PXB, and the response ID based on the addresses of the first touch electrode 294 and the second touch electrode 292. Data leakage can be further reduced by allowing the PUF-ID extracting circuit to generate and select the two response IDs.

3-2. Configuration of Pixel Circuit PXB

Figure 8:
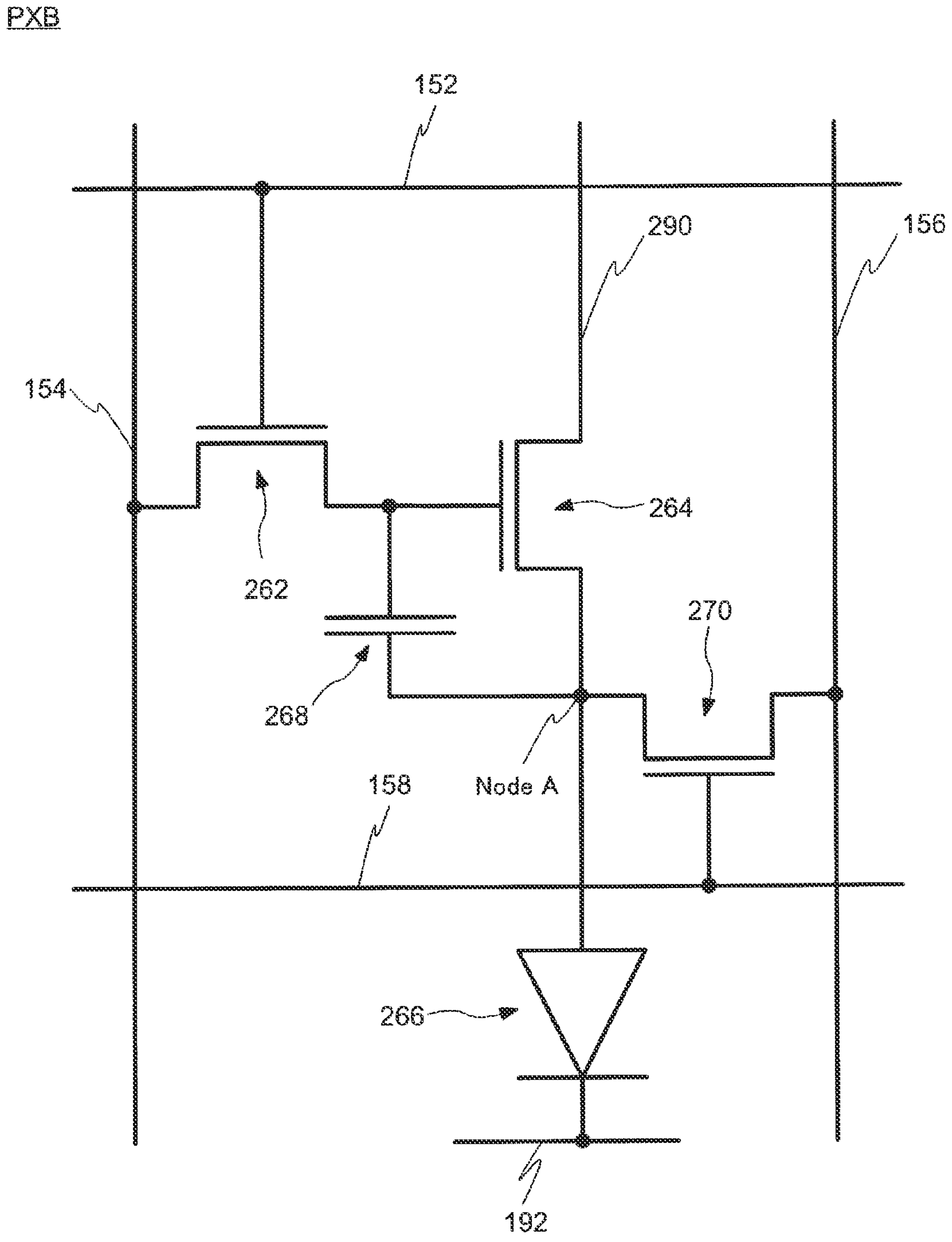
FIG. 8 is a circuit diagram showing a pixel circuit according to an embodiment of the present invention.

FIG. 8 is a circuit diagram showing the pixel circuit PXB according to an embodiment of the present invention. Description of the same or similar components as those of FIGS. 1 to 7 will be omitted.

As shown in FIG. 8, the pixel circuit PXB includes a drive transistor 264, a selection transistor 262, a voltage measuring transistor 270, a light emitting element 266 and a storage capacitor 268.

A gate electrode of the drive transistor 264 is connected to a drain electrode of the selection transistor 262. A source electrode of the drive transistor 264 is connected to a drive power line 290. A drain electrode of the drive transistor 264 is connected to the anode of the light emitting element 266. A gate electrode of the selection transistor 262 is connected to the scan signal line 152. A source electrode of the selection transistor 262 is connected to the video signal line 154. The drain electrode of the selection transistor 262 is connected to the gate electrode of the drive transistor 264. The cathode of the light emitting element 266 is connected to a reference power line 192. One end of the storage capacitor 268 is connected to the gate electrode of the drive transistor 264. The other end of the storage capacitor 268 is connected to the drain electrode of the drive transistor 264. A gate electrode of the voltage measuring transistor 270 is connected to the control signal line 158. A source electrode of the voltage measuring transistor 270 is connected to the drain electrode of the drive transistor 264. A drain electrode of the voltage measuring transistor 270 is connected to the voltage measurement line 156. The reference power line 192 is provided in common to the plurality of pixel circuits PXB. A constant potential is applied to the reference power line from the plurality of terminal electrodes 240. Depending on the voltage applied to the source electrode and the drain electrode of each transistor, the function of each electrode as the source and drain may be interchanged.

In the pixel circuit PXB, a voltage of node A can be read by including the voltage measuring transistor 270, the control signal line 158, and the voltage measurement line 156. Specifically, by supplying a high-level signal to the control signal line 158, a high-level signal is supplied to the gate electrode of the voltage measuring transistor 270. The voltage measuring transistor 270 is in a conductive state, and the voltage measuring transistor 270 can flow a current from the source electrode toward the drain electrode. Therefore, the voltage of node A is supplied to the voltage measurement line 156, and the voltage of node A can be measured by measuring the voltage of the voltage measurement line 156.

The circuit configuration of the pixel circuit PXB is an example, and is not limited thereto. Since the pixel circuit PXB can be driven by a commonly used driving method of a liquid crystal display device except for driving the voltage measuring transistor 270, the description thereof is omitted.

When the normal operation mode is selected by the mode selecting circuit 310 in the EL display device 100C according to an embodiment of the present invention, for example, the scan signal line 152 is selected, and the voltage of node A is read. In addition, the data written to the pixel by the controller 370 may be corrected based on the voltage of the read node A, and the corrected data may be fed back to each pixel.

3-3. Driving Method of Information Processing Device 10C

The flowchart shown in FIG. 4 can be used to drive the information processing device 10C according to an embodiment of the present invention. In the driving method of the information processing device 10C according to an embodiment of the present invention, the addresses of the first touch electrode 294 and the second touch electrode 292 in the description of FIG. 4 are replaced with the address of the pixel circuit PXB, and the response ID of the information processing device 10C is generated by utilizing the characteristics of the node A included in the pixel circuit PXB. Description of the same or similar components as those of FIGS. 1 to 8 will be omitted.

The driving of the information processing device 10C is started. Step 31 (S31) is the same as the description of FIG. 4, and the description here is omitted.

Next, in step 33 (S33), the number of frames to be averaged, the number of digits or bits of the digital signal for judging an even number or odd number, and the addresses of the pixel circuit PXB are transferred from the host 500 or the user to the integrated circuit 300. Each pixel circuit PXB is initialized. The initialization here includes uniformly converting the image data written in each pixel circuit PXB into the same data. Specifically, it includes writing a voltage corresponding to 0V or black to each pixel circuit PXB, and setting the voltage of node A. By the initialization, the voltage of node A of each pixel circuit PXB can be set to a state in which the same data is written. When coordinates of the pixel circuit PXB provided at a position where the n scan signal line 152 arranged in parallel to the X-direction in a top view and the m video signal line 154 arranged in parallel to the Y-direction in a top view intersect are referred to as coordinates (n, m), the coordinates (n, m) are referred to as addresses of the pixel circuit PXB. The numerical values n and m are natural numbers, respectively. Since the description other than what is described here is the same as the description of step 33 (S33) of FIG. 4, the description thereof is omitted.

Next, in step 35 (S35), the information processing device 10C detects whether the address of the pixel circuit PXB is output. In step 31 (S31), since the PUF operation mode is selected, the controller 370 and the PUF-ID extracting circuit 380 are driven. To detect whether the address of the pixel circuit PXB is output, the address signal or address non-detection signal is sent from the electronic device 100 via the OUT1, processed by the integrator circuit 330, the S/H circuit and AD converter 340, and the averaging circuit 350, and stored in the memory circuit 360. The controller 370 reads the processed address signal or the addressed non-detection signal from the memory circuit 360. The controller 370 detects the address by processing the read signal. For example, when the controller 370 processes the address signal, the address of the pixel circuit PXB (YES) is detected. When the controller 370 processes the address non-detection signal, the controller 370 detects that "the address of the pixel circuit PXB is not output" (NO). The drive associated with NO is described below.

If YES in step 35 (S35), the information processing device 100 executes step 37 (S37). In step 37 (S37), the controller 370 confirms the detection number. The controller 370 here calculates the number of addresses of the detected pixel circuit PXB (the number of addresses of the pixel circuit PXB). Since the description other than what is described here is the same as the description of step 37 (S37) of FIG. 4, the description thereof is omitted.

Step 39 (S39) is the same as the description of FIG. 4, and the description here is omitted. When returning from step 39 (S39) to step 33 (S33) and the information processing device 10 continues to be driven, the information processing device 10 may send a signal requesting a change of the address of the pixel circuit PXB (change of challenge), and the address of the detected pixel circuit PXB (detection address) to the host 500. For example, when the host 500 accepts the signal requesting a change of the challenge and the detection address, the address of an undetected pixel circuit PXA may be sent to the information processing device 10 as the challenge. For example, the address of the pixel circuit PXB excluding the address around the detection address may be sent to the information processing device 10 as the challenge.

Step 35 (S35), step 51 (S51), step 53 (S53), and step 55 (S55) are the same as those in FIG. 4, and therefore description thereof is omitted here.

If NO in step 35 (S35), the frame averaging process is executed by the frame average processing circuit 382 in step 41 (S41). Specifically, the address of the undetected pixel circuit PXB is selected, the voltage of node A of the selected pixel circuit PXB is read, the read voltage (second voltage) is input to the integrator circuit 330, and it is converted into the digital signal by the S/H circuit and AD converter 340. For example, when the S/H circuit and AD converter 340 have a 12-bit AD conversion circuit, the second voltage is converted into a 12-bit digital signal. That is, when expressed in a decimal system, the second voltage takes any one value from 1 to 4096. At this time, the averaging circuit 350 acquires a second voltage multiple times in one frame and averages the acquired second voltage. For example, in step 33, when the number of frames to be averaged is set to 60, in each of the 60 frames, the second voltage is acquired multiple times, and the acquired second voltage is averaged. The averaged signal in each of the 60 frames is stored in the memory circuit 360. Subsequently, the averaged signal in each of the 60 frames is transferred to the memory circuit 360 or the frame average processing circuit 382, and the frame averaging process is performed. The operation described above is performed at the addresses of all the pixel circuits PXB to be selected. The above step is step 41 (S41).

Subsequently, step 43 (S43), step 45 (S45), and step 47 (S47) are executed by replacing the addresses of the first touch electrode 294 and the second touch electrode 292 with the address of the pixel circuit PXB. Otherwise, the description is the same as that of FIG. 4, and therefore, the description is omitted here.

4. Fourth Embodiment

An authentication method using the information processing device 10 according to an embodiment of the present invention will be described with reference to FIGS. 9 and 10. Specifically, an authentication method using a fingerprint and a response ID will be described. Description of the same or similar components as those of FIGS. 1 to 8 may be omitted.

Figure 9:
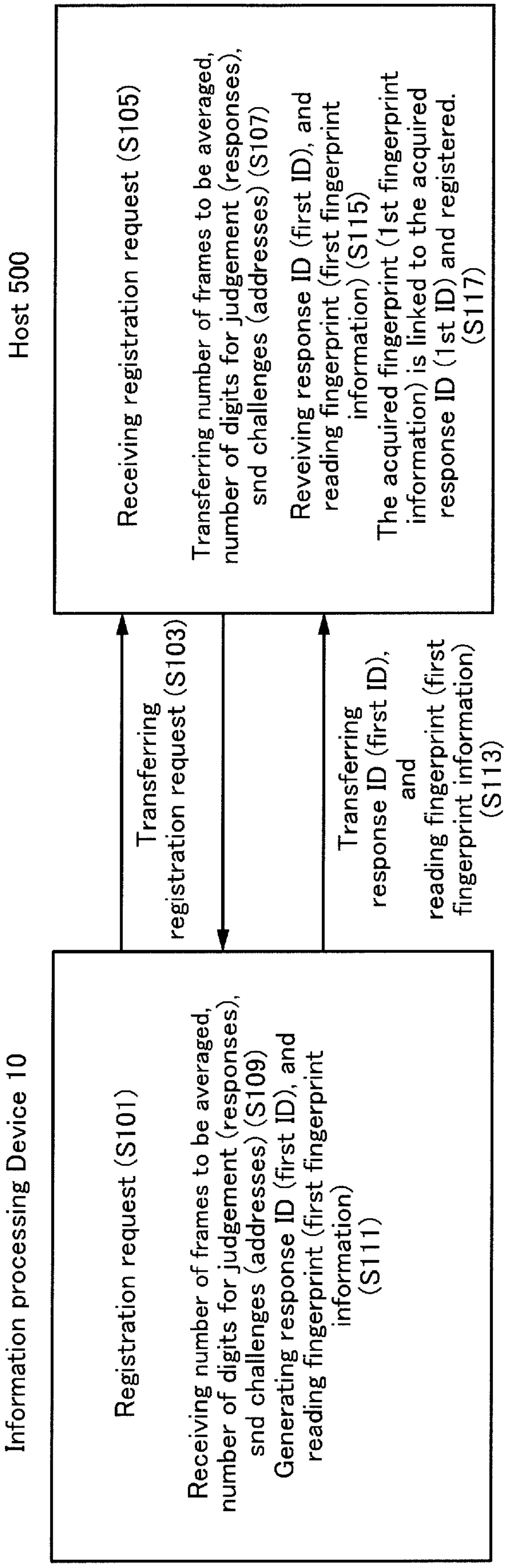
FIG. 9 is a flowchart showing an authentication method using an information processing device according to an embodiment of the present invention.
Figure 10:
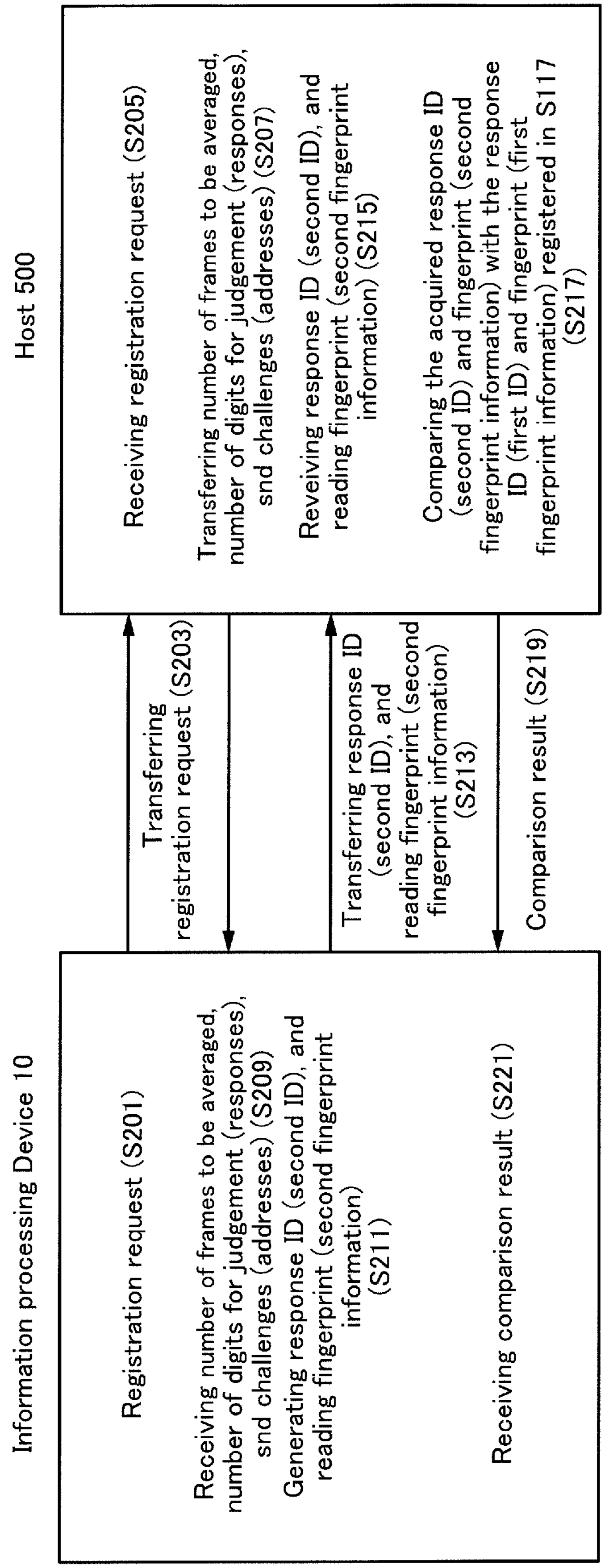
FIG. 10 is a flowchart showing an authentication method using an information processing device according to an embodiment of the present invention.

FIGS. 9 and 10 are flowcharts showing an authentication method using the information processing device 10 according to an embodiment of the present invention.

As shown in FIG. 9, when the association and registration of the first response ID (first ID) and the fingerprint information is started, in step 101 (S101), the information processing device 10 requests the host 500 to register a first ID and the fingerprint to be touched (FP) information (first fingerprint information).

In step 103 (S103), a registration request is transferred from the information processing device 10 to the host 500. In step 105 (S105), the host 500 receives the registration request.

Next, in step 107 (S107), the number of frames to be averaged, the number of digits of the digital signal for judging (responses) an even number or odd number, and the addresses (challenges) of the first touch electrode 294 and the second touch electrode 292 are transferred from the host 500 to the information processing device 10.

In step 109 (S109), the number of frames to be averaged, the number of digits of the digital signal for judging an even number (responses) or odd number, and the addresses (challenges) of the first touch electrode 294 and the second touch electrode 292 are acquired by the information processing device 10.

In step 111 (S111), in the information processing device 10, the first ID (response ID) is generated based on the flowchart shown in FIG. 4 and the explanation of FIG. 4. When the user touches the information processing device 10 with a finger, the information processing device 10 reads the first fingerprint information. Reading of the first fingerprint information is performed by, for example, an imaging device included in the information processing device 10. For example, the imaging device included in the information processing device 10 is a camera. Reading of the first fingerprint information may be performed by a fingerprint sensor using a touch panel other than the imaging device. Since reading of the first fingerprint information can be performed using commonly used techniques, a detailed description thereof will be omitted.

Next, in step 113 (S113), the first ID and the first fingerprint information are transferred from the information processing device 10 to the host 500. Next, in step 115 (S115), the first ID and the first fingerprint data are acquired by the host 500. In step 117 (S117), at the host 500, the acquired first ID is associated (linked) with the acquired first fingerprint information. The associated first ID and the first fingerprint data are registered in the host 500.

Next, authentication will be described with reference to FIG. 10. As shown in FIG. 10, when the authentication is started, in step 201 (S201), the information processing device 10 requests the host 500 to authenticate. In step 203 (S203), the authentication request is transferred from the information processing device 10 to the host 500. In step 205 (S205), the host 500 receives the authentication request.

Since step 207 (S207) and step 209 (S209) are the same as step 107 (S107) and step 109 (S109), respectively, descriptions thereof are omitted.

In step 211 (S211), in the information processing device 10, a second ID (response ID) is generated based on the flowchart shown in FIG. 4 and the explanation of FIG. 4. When the user touches the information processing device 10 with a finger, the information processing device 10 reads the second fingerprint information. The same method as that for reading the first fingerprint information is used for reading the second fingerprint information.

Next, in step 213 (S213), the second ID and the second fingerprint information are transferred from the information processing device 10 to the host 500. Subsequently, in step 215 (S215), the second ID and the second fingerprint information are acquired by the host 500.

Subsequently, in step 217 (S217), the acquired second ID and second fingerprint information are compared with the registered first ID and first fingerprint information at the host 500.

In step 219 (S219), the comparison result is transferred from the host 500 to the information processing device 10. Finally, in step 221 (S221), the comparison result is acquired by the information processing device 10. At this time, when the subject touching the information processing device 10 is the user who has registered a fingerprint in the host 500, the comparison result matches, and it is determined that the subject is the user of the information processing device 10. On the other hand, when the subject touching the information processing device 10 does not register a fingerprint in the host 500, the comparison result does not match, and it is determined that the subject is not the user of the information processing device 10.

As described above, the information processing device according to an embodiment of the present invention can be used for authentication by including the PUF-ID extraction circuit. The information processing device according to an embodiment of the present invention can associate and register the ID generated by the PUF-ID extraction circuit with the fingerprint information. Therefore, by using the information processing device according to an embodiment of the present invention, unauthorized access to the host due to forgery of fingerprint information from another information processing device can be prevented. In addition, by using the information processing device according to an embodiment of the present invention, it is possible for the user to omit the labor of manually inputting the ID to the information processing device, thereby improving the convenience of the information processing device.

Each embodiment or a part of each embodiment described above as the embodiment of the present invention can be implemented in combination as appropriate as long as they do not conflict with each other.

Even if other working effects which are different from the working effect brought about by the mode of each above-mentioned embodiment, what is clear from the description in this description, or what can be easily predicted by the person skilled in the art is naturally understood to be brought about by the present invention.

What is claimed is:

1. An information processing device comprising:

an electronic device;

an averaging circuit acquiring output signals from the electronic device multiple times in a predetermined period and averaging the signals acquired multiple times;

a memory circuit storing an averaged signal averaged by the averaging circuit;

a PUF-ID extraction circuit generating a unique identifier based on the averaged signal;

a controller configured to control a normal operation based on the averaged signal; and a mode selection circuit, wherein the mode selection circuit selects one of a PUF operation mode in which the PUF-ID extraction circuit is operated, and a normal operation mode in which the controller is operated, and the memory circuit is electrically connected to the controller or the PUF-ID extraction circuit.

2. The information processing device according to claim 1, wherein the PUF-ID extraction circuit has an average processing circuit, and the average processing circuit further averages a plurality of averaged signals acquired in each of a plurality of predetermined periods to generate an averaged processing signal.

3. The information processing device according to claim 2, wherein the PUF-ID extraction circuit has a judgment circuit, and the judgment circuit judges whether a predetermined bit of the averaged processing signal is an even number or an odd number, and generates the unique identifier.

4. The information processing device according to claim 3, wherein an output signal from the electronic device is output from a challenge included in the electronic device, and the PUF-ID extraction circuit has an ID selecting circuit generating a unique identifier corresponding to the challenge specified by a host or an user.

5. A driving method of an information processing device comprising:

acquiring output signals multiple times in a predetermined period;

averaging the output signals acquired multiple times;

generating a unique identifier based on an averaged signal;

averaging processing a plurality of averaged signals acquired in each of a plurality of predetermined periods;

generating an averaged processing signal;

judging whether a predetermined bit of the averaged processing signal is an even number or an odd number; and generating the unique identifier based on a judgment result.

6. The driving method according to claim 5, further comprising:

selecting one of a PUF operation mode based on instructions of a host or a user and selecting a normal operation mode based on the instructions of the host or the user.

7. The driving method according to claim 5, further comprising:

selecting the unique identifier based on a challenge specified by the host or user.

8. An information processing device comprising:

a touch panel;

a PUF-ID extraction circuit generating a unique identifier based on a output signal from the touch panel;

an averaging circuit acquiring output signals from the touch panel multiple times in a predetermined period and averaging the signals acquired multiple times;

a memory circuit storing an averaged signal averaged by the averaging circuit;

a PUF-ID extraction circuit generating a unique identifier based on the averaged signal; and a mode selection circuit;

wherein the touch panel includes touch electrodes, the output signal from the touch panel is a digitally converted signal of a capacitance of the touch electrodes when not touched, the mode selection circuit selects one of a PUF operation mode in which the PUF-ID extraction circuit is operated, and a normal operation mode, and in the normal operation mode, the touch position is detected based on a signal of a capacitance change of the touch electrode.

9. The information processing device according to claim 8, further comprising a display device, wherein the touch panel overlaps a display section of the display device.

* * * * *